United States Patent
Yoshikawa

Patent Number: 6,047,140
Date of Patent: *Apr. 4, 2000

[54] CARTRIDGE, LABORATORY SYSTEM, IMAGE DATA RECORDING METHOD, CAMERA AND PHOTOGRAPH PROCESSING METHOD

[75] Inventor: Sumio Yoshikawa, Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/115,990

[22] Filed: Jul. 15, 1998

[30] Foreign Application Priority Data

Jul. 15, 1997 [JP] Japan .................................. 9-190277
Aug. 5, 1997 [JP] Japan .................................. 9-211035

[51] Int. Cl.[7] .................................................. G03B 17/24
[52] U.S. Cl. ..................... 396/310; 396/311; 396/319; 396/321; 396/429; 396/512; 396/515
[58] Field of Search .................................... 396/297–300, 396/310, 311, 321, 429, 511, 512, 515, 538

[56] References Cited

U.S. PATENT DOCUMENTS

| | | | |
|---|---|---|---|
| 5,032,855 | 7/1991 | Taniguchi et al. | 396/321 |
| 5,142,310 | 8/1992 | Taniguchi et al. | 396/321 |
| 5,701,530 | 12/1997 | Fujino | 396/321 |
| 5,786,904 | 7/1998 | Narita | 358/487 |
| 5,819,126 | 10/1998 | Kitagawa et al. | 396/319 |
| 5,838,457 | 11/1998 | Umemoto | 358/302 |

FOREIGN PATENT DOCUMENTS

| | | | |
|---|---|---|---|
| 0 342 628 | 11/1989 | European Pat. Off. | G03B 17/30 |
| 0 344 916 | 12/1989 | European Pat. Off. | G03B 17/24 |

*Primary Examiner*—David M. Gray
*Attorney, Agent, or Firm*—Sughrue, Mion, Zinn, Macpeak & Seas, PLLC

[57] ABSTRACT

The cartridge accommodates a shooting film therein, and includes at least an electrically connectable contact on an outer surface layer thereof, and said recording medium has a recording area for storing digital data of an index image based on images recorded on said shooting film. Therefore, by recording the digital data of images recorded on the shooting film in the recording medium of the cartridge a customer can read the image data and process the image data.

8 Claims, 15 Drawing Sheets

F I G. 1
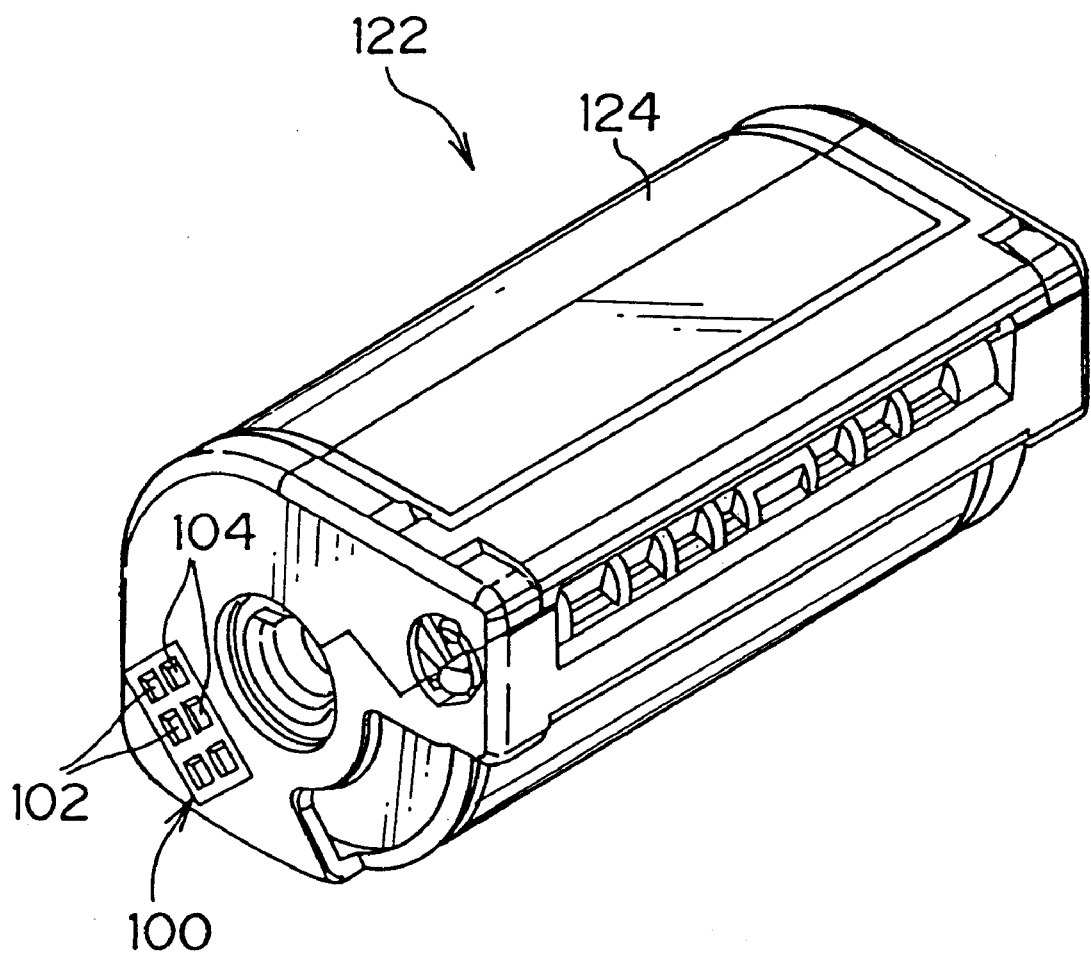

F I G. 4
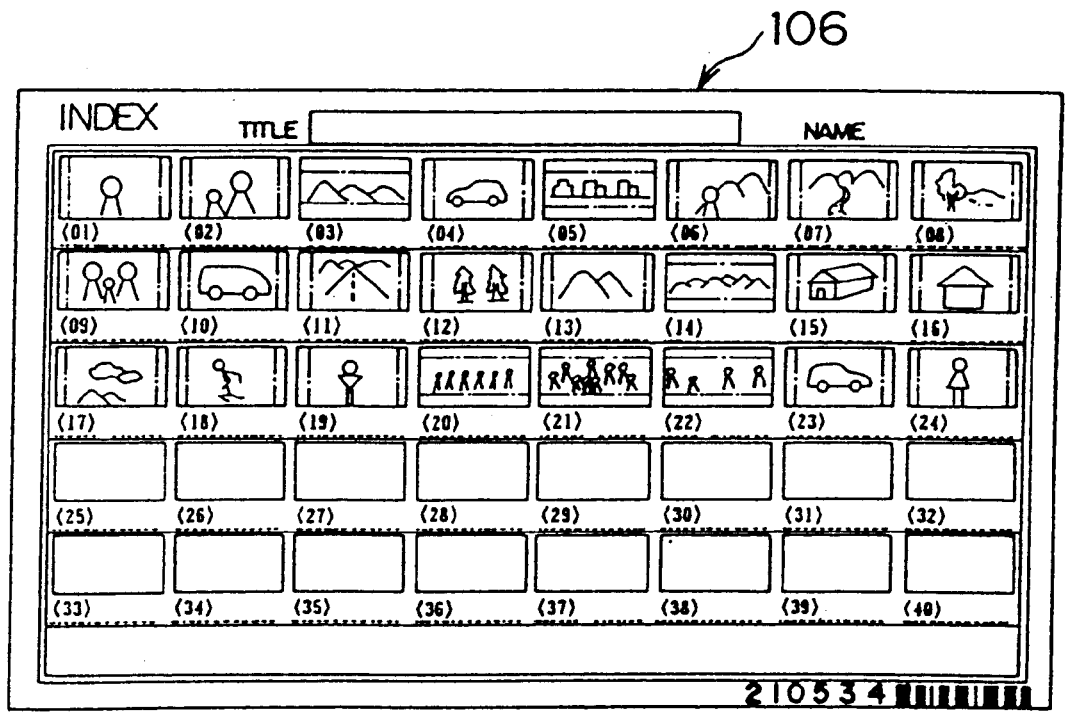

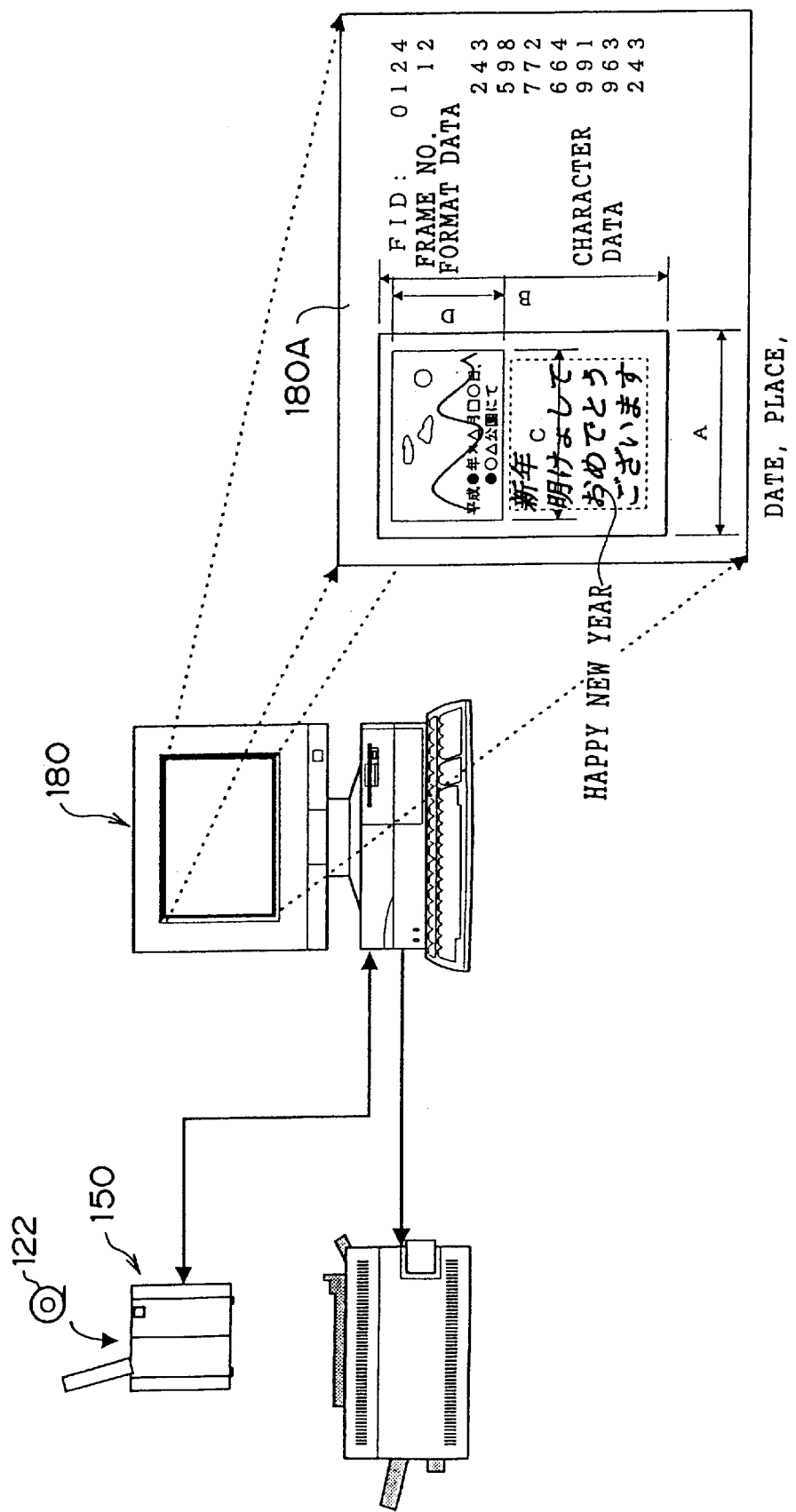

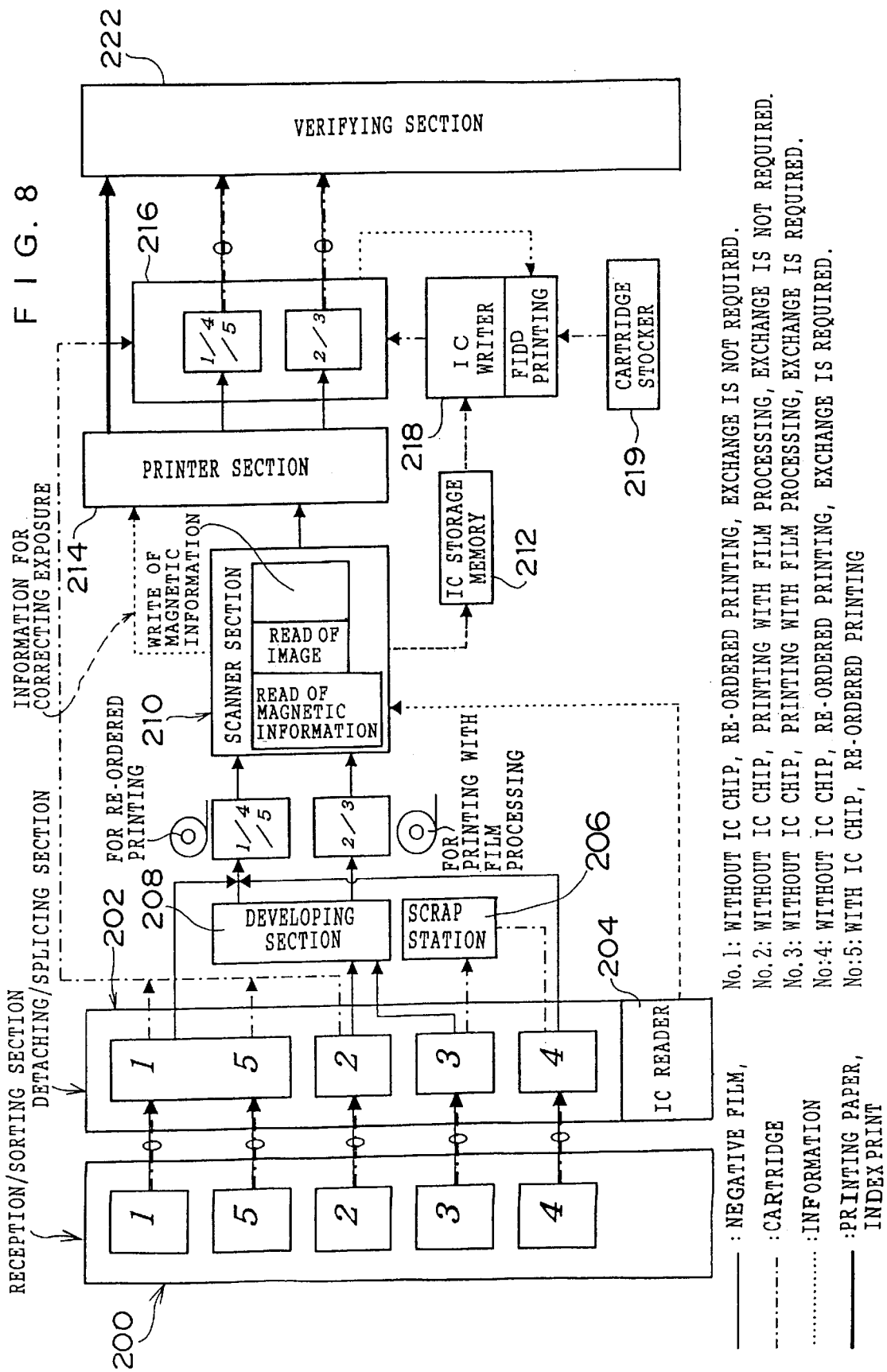

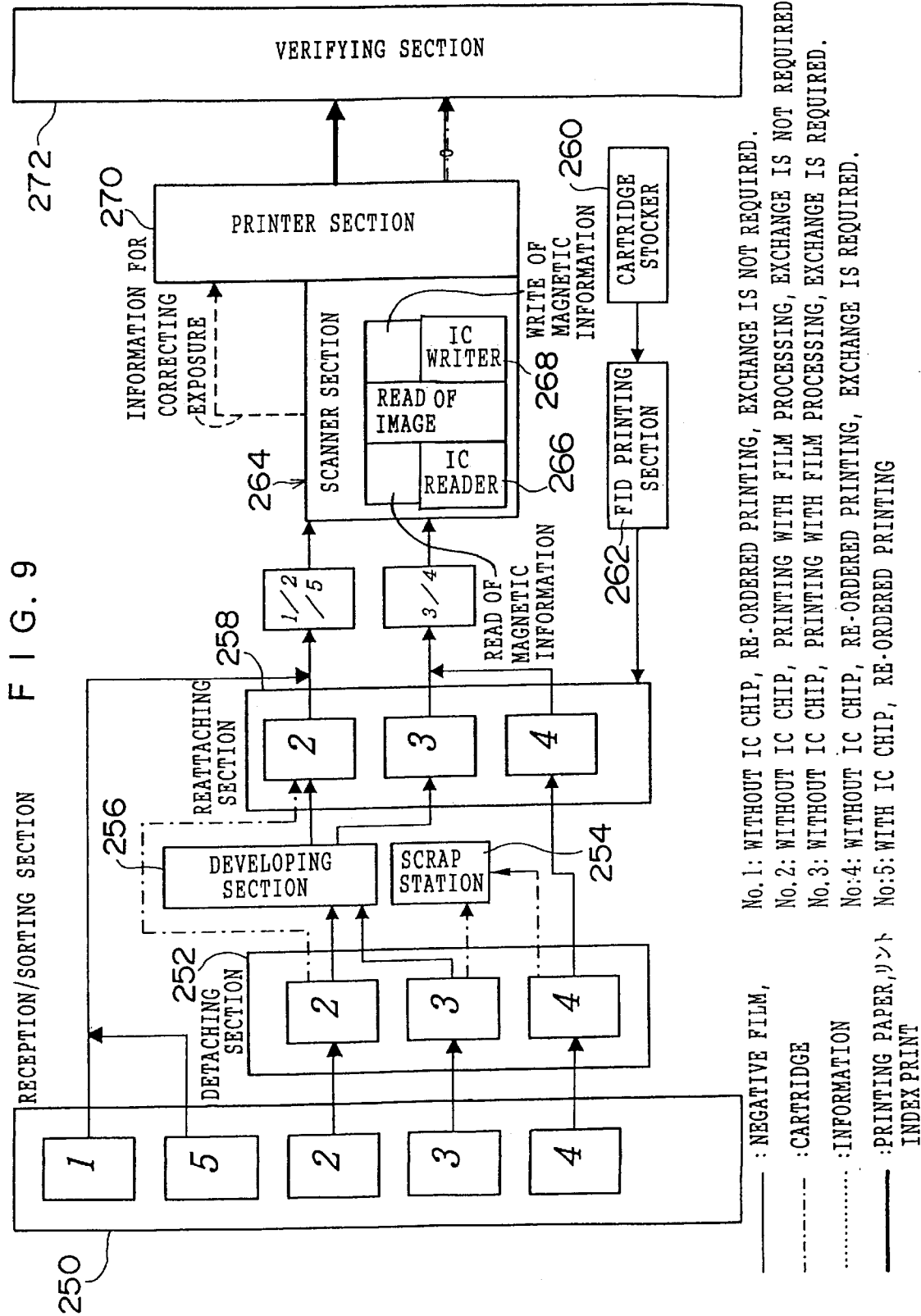

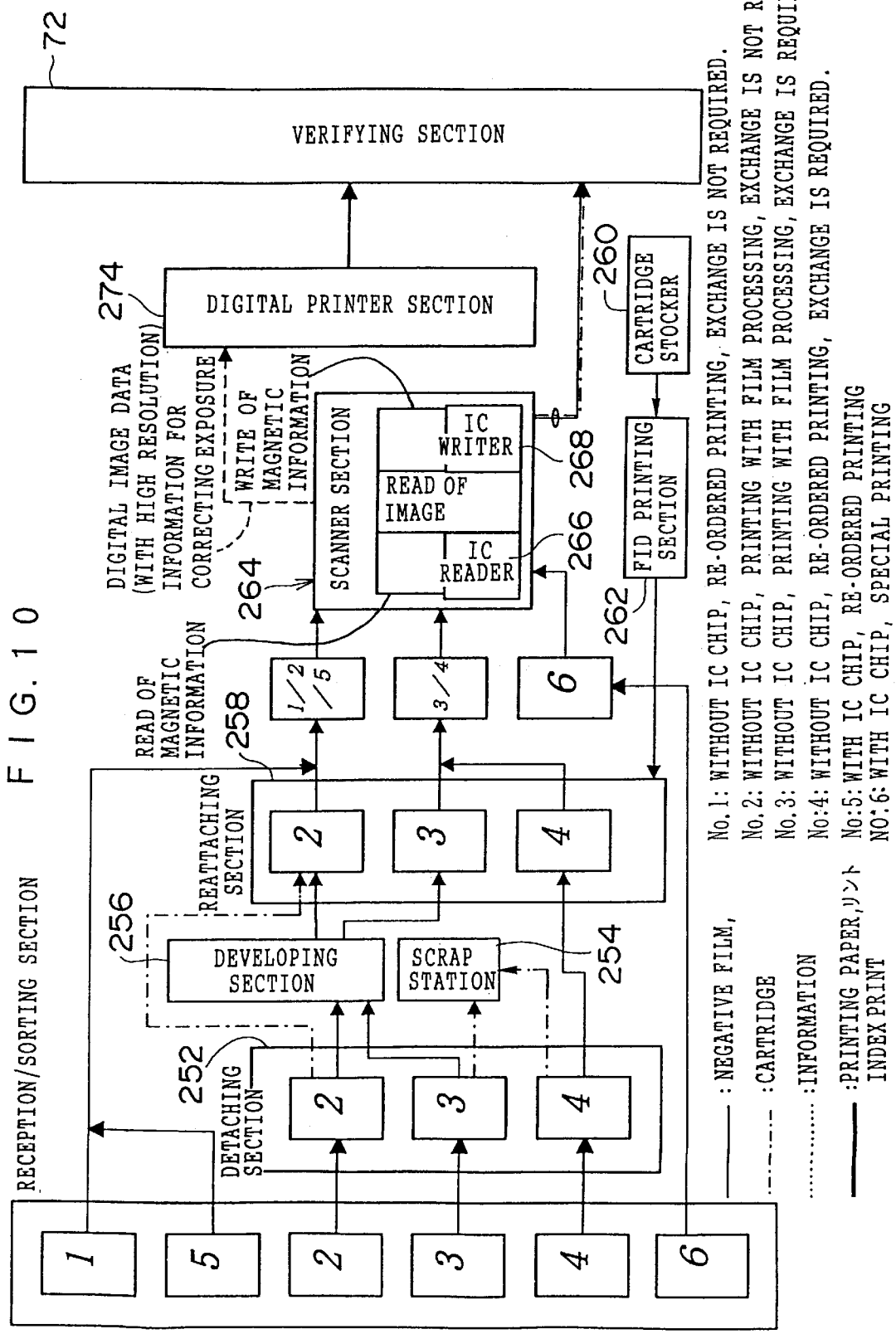

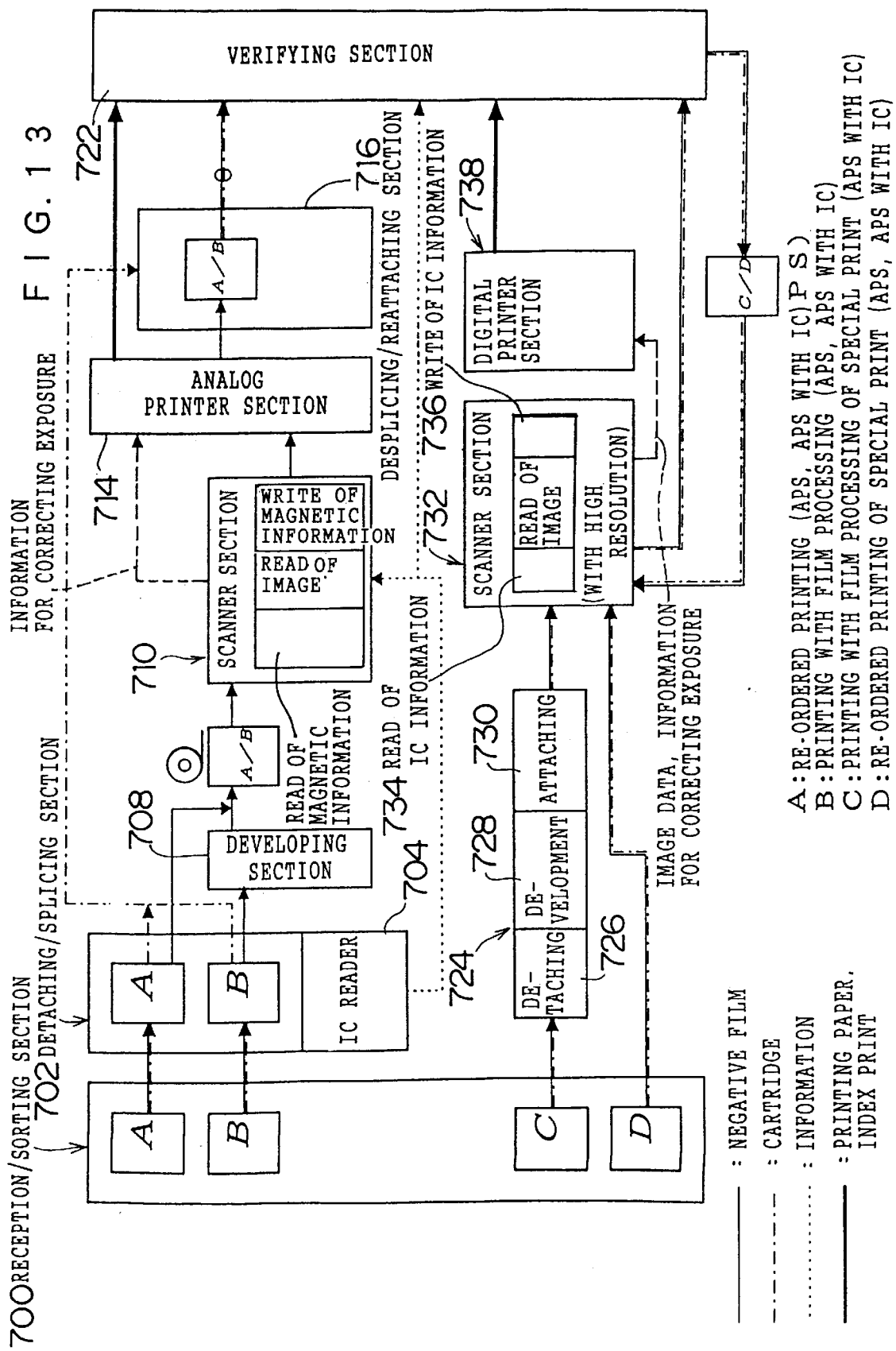

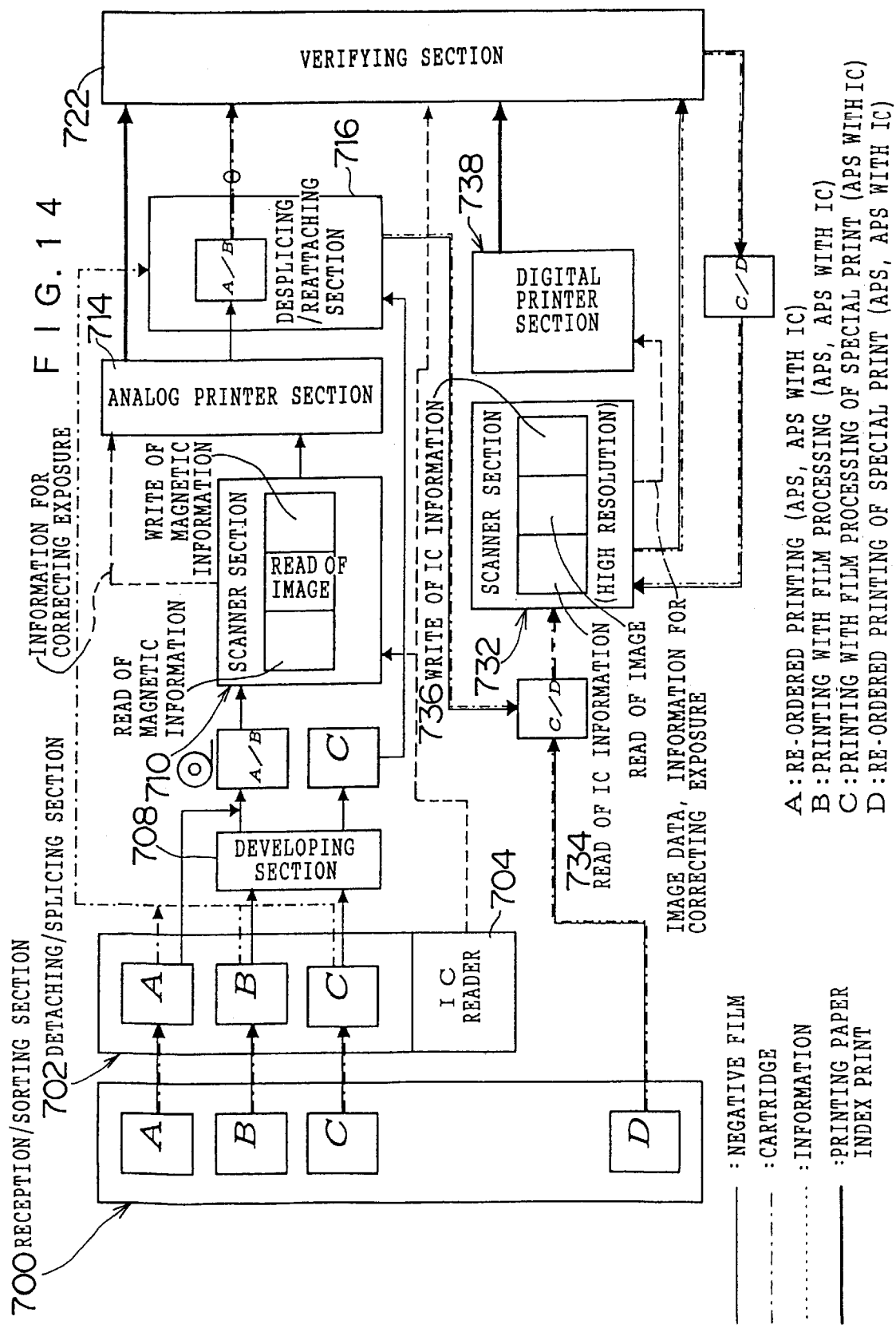

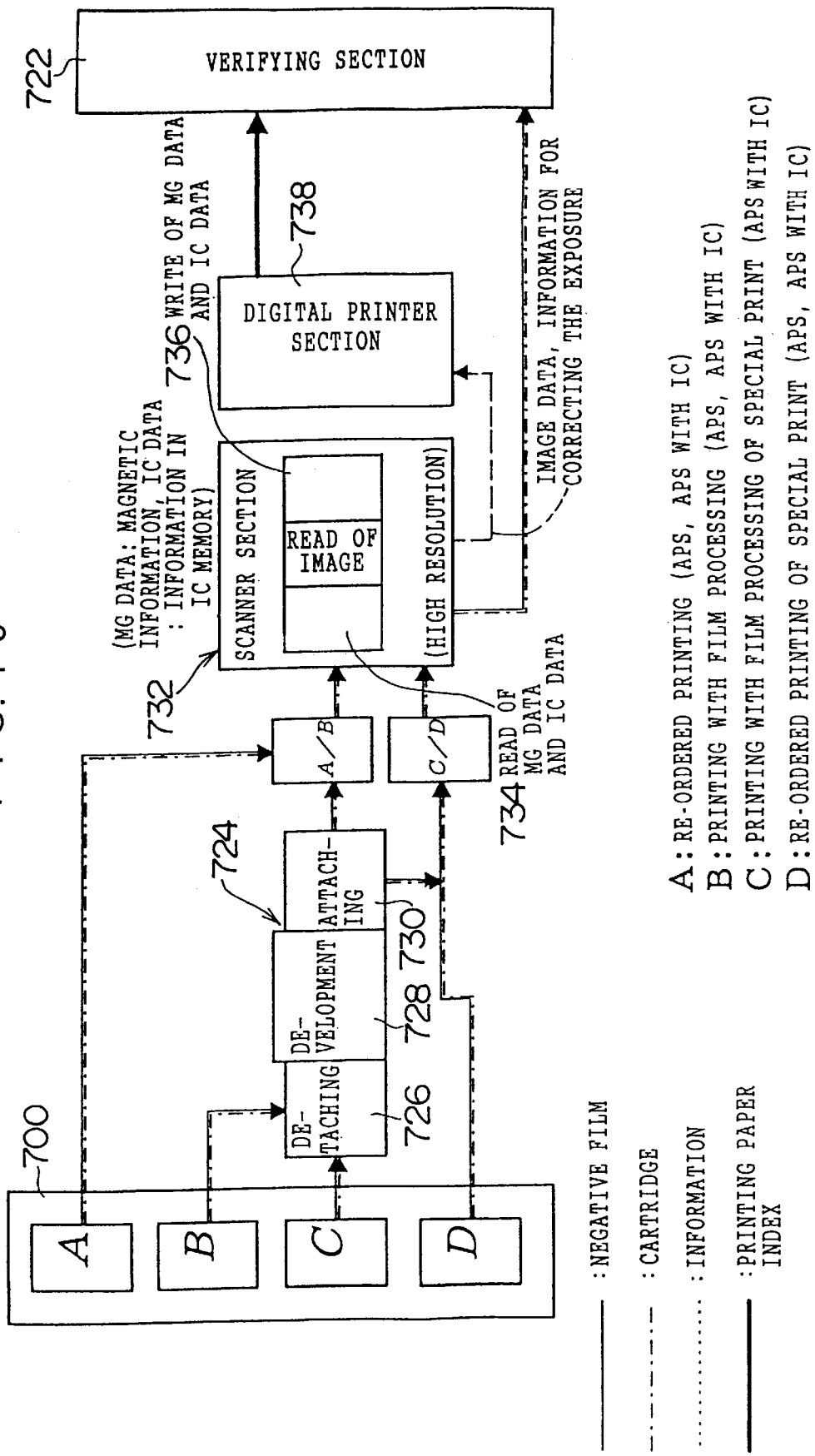

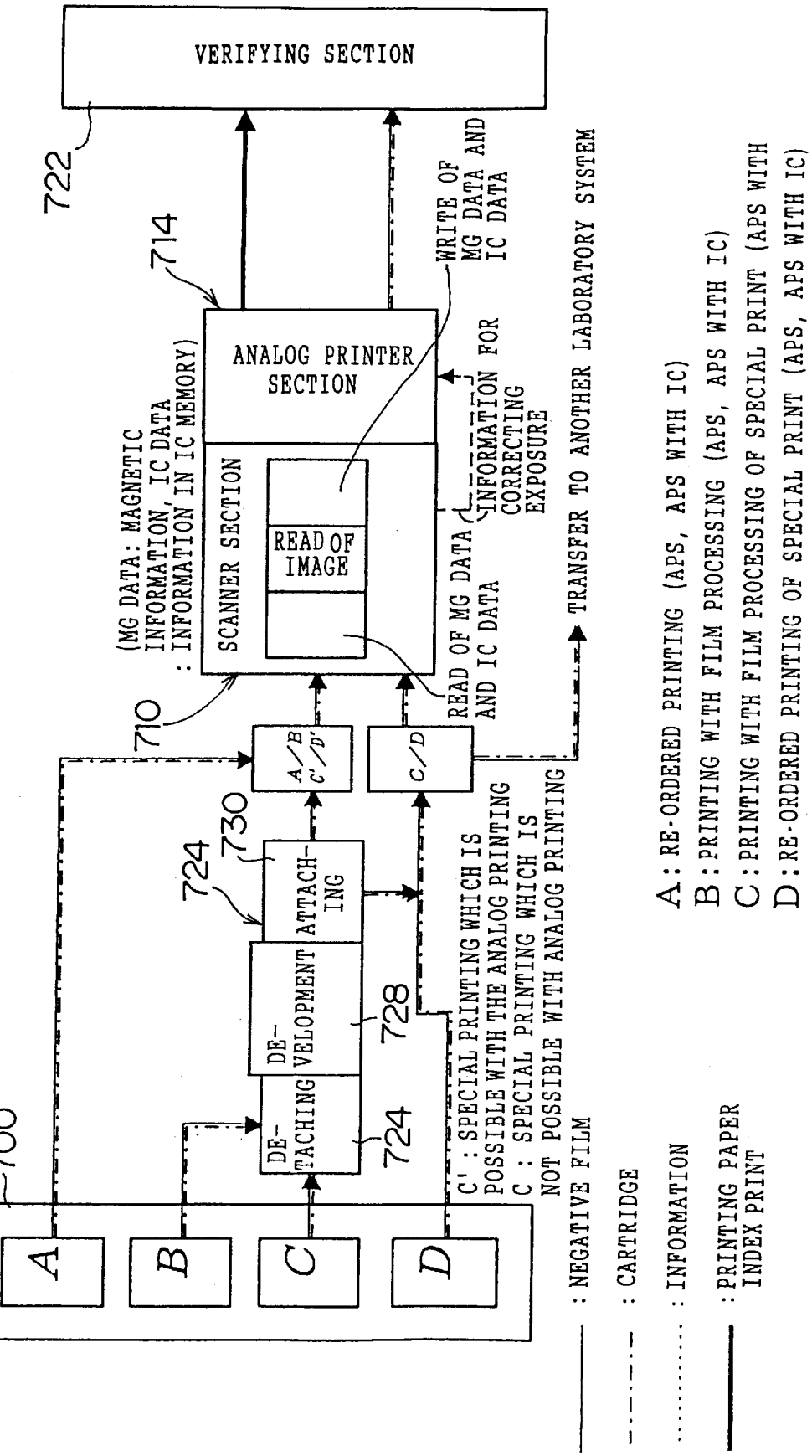

CARTRIDGE, LABORATORY SYSTEM, IMAGE DATA RECORDING METHOD, CAMERA AND PHOTOGRAPH PROCESSING METHOD

BACKGROUND OF THE INVENTION

1. Field of the Invention

The present invention relates to a cartridge which accommodates a shooting film such as a film for photographs therein and is provided with a recording medium, at least an electrically connectable contact for the recording medium being exposed on an outer surface of the cartridge, and a laboratory system for performing each processing of receiving the cartridge, attaching, detaching the shooting film to/from the cartridge for the development, developing the shooting film, and effecting printing on a printing paper based on the images visually developed on the shooting film. Furthermore, the present invention relates to a camera loaded with a cartridge provided with a recording medium and at least an electrically connectable contact for the recording medium exposed on an outer surface of the cartridge, and a photograph processing method for performing each processing of receiving the cartridge, attaching, detaching the shooting film to/from the cartridge for the development, developing the shooting film, printing and exposure on the printing paper based on the image visually developed on the shooting film, and preparing an index print, as well as finally verifying the cartridge, the shooting film, the printing paper, and the index print based on the ID attached thereto, respectively, and returning them to customers.

2. Description of the Related Art

Conventionally, with the laboratory system, after receiving and developing a shooting film after having taken photographs (hereinafter referred to as a "negative film") requested by a customer, and printing them on a printing paper, the printing paper is developed, and they are put into a DP bag collectively and returned to the customer.

At the time of receiving the shooting film, for example, if it is a printing with film processing or a reordered printing, the number of printing, and if there is any designation of special printing such as trimming or are not conveyed orally to a salesclerk, and the salesclerk writes them in a specified form.

Recently, such a system is established that a magnetic recording layer is provided on the negative film, and the ordered contents are recorded in this magnetic recording layer, thereby the laboratory system can read the information from the magnetic recording layer of the negative film to recognize the requested contents from the customer (Advanced Photo System, i.e., APS).

Hence, the task such as writing the ordered contents at the time of receiving the order can be saved, to improve work efficiency.

Due to the prevalence of personal computers, a digital image is now highlighted, as compared with a so-called analog image recorded on a printing paper or the like. This digital image is easily image-processed, and various original images can be prepared by taking a digital image into a personal computer.

When greeting cards such as New Year cards or the like are prepared and requested to a laboratory system, since the image recorded on the negative film (or a printed image on a printing paper) is an analog image, it has to be read by an image reading apparatus, referred to as a scanner, in order to take it into the personal computer.

However, it is very bothersome to select a desired image from images recorded on an elongated negative film, or to select a desired image from separate printing papers for each image.

Incidentally, with the above-mentioned APS, an index print is handed over to customers at the time of returning the printing with film processing. Customers can see images arranged in a matrix on this index print to select desired images at the time of reordering.

Since this index print is processed as the digital image in the laboratory system, if this digital image data can be provided to the customer, the above-mentioned equipment such as scanner is not necessary.

However, if a recording medium where the index image data is recorded is given to customers in addition to the cartridge and the index print, customers will have to homologize not only the cartridge and the index print, but also the recording medium and the cartridge.

A cartridge to which an IC memory is attached has been proposed (for example, see U.S. Pat. No. 2,602,583 (Japanese Patent Application Laid-Open (JP-A) No. 4-223455), Japanese Patent Application Laid-Open (JP-A) No. 1-279250, and Japanese Utility Model Application Laid-Open (JP-U) No. 2-5746).

The information in the IC memory is read in the laboratory system, and used as the information at the time of printing. That is to say, the IC memory has a function corresponding to the magnetic recording layer of APS, and serves only as the information transfer means between customers and the laboratory system. There is no suggestion that customers can read the information freely, process it and write into it.

Moreover, some types of cameras have a mechanism for selecting panorama printing (P), classic printing (C) or vigorous vision (H) at the time of shooting with this camera, and this mechanism is also attached to a one-time use camera which is a cheap camera (for example, "Utsurundesu" produced by Fuji PHOTO Film, CO., LTD hereinafter referred to as "LF"). However, this is to be optically attached outside of the image recording area of the film, and it is not for recording the information on the magnetic recording layer.

That is to say, in order to mount a mechanism for magnetically recording on the magnetic recording layer in a camera, a magnetic head, a circuit for controlling the magnetic head, and a feeding mechanism for feeding the film stably are required, thus the camera becomes considerably expensive. Therefore, with the so-called cheap camera, only the optical information can be recorded, and the data volume becomes only 2 to 3 bits, hence it is limited to only very small data.

It can be understood that the IC memory of the cartridge to which the above-mentioned IC memory is attached is read on the laboratory system side and used as the information at the time of printing, but the information recorded by the camera and the processing method on the laboratory system side based on the information is fragmentary, and a system corresponding to various orders has not yet been established.

SUMMARY OF THE INVENTION

It is the object of the present invention to provide a cartridge which can record at least digital data of images recorded on the shooting film contained therein.

Another object is to provide a laboratory system in which digital data of images recorded on the film in this cartridge is recorded on a recording medium provided in the cartridge, to make it possible for customers to freely read and process the data, and by writing a converted layout and format on the recording medium, they can be associated with the digital data recorded therein in advance to prepare an order form.

Furthermore, it is another object of the present invention to provide a camera which can record the information such as printing instruction or the like easily on the recording medium attached in the cartridge without obstructing the feeding of the shooting film.

Furthermore, another object of the present invention is to provide a photograph processing method which can be used also in the conventional laboratory system, in which the propriety of the printing is determined based on the information read out from the recording medium attached in the cartridge, and prints can be surely sorted out.

The first aspect of the present invention is a cartridge which accommodates a shooting film therein, and is provided with a recording medium having at least an electrically connectable contact on the outer surface of the cartridge, the recording medium having a recording area for storing digital data for an index image based on images recorded on the shooting film.

According to this aspect, by recording the digital data for index image on the recording medium provided in the cartridge, the images recorded on the shooting film accommodated therein can be recognized without taking this shooting film from the cartridge. Here, by seeing the index print, recognition is possible, but by recording it as the digital data, the digital data is effective, for example, when it is taken into a personal computer. It is faster than taking it in by scanning the analog image (an image actually represented on a paper) with a scanner or the like.

Thus, at least digital data for images recorded on the shooting film accommodated in the cartridge can be recorded on the recording medium, and the image contents can be recognized without taking the shooting film out from the cartridge.

In the second aspect, information equivalent to optical information recorded on the shooting film or the magnetic information recorded on the shooting film on which a magnetic recording layer is provided is recorded on the recording medium together with the digital data for index image.

According to the second aspect, the information recorded on the shooting film together with the digital data of the index image, that is, the optical information such as a bar code or the like can be read out and recorded on the recording medium during the laboratory processing. In addition, if the shooting film corresponds to APS (Advanced Photo System), it has the magnetic recording layer. The magnetic information recorded in this magnetic recording layer can be also recorded on the recording medium.

By recording these information, if the contents of the recording medium is read out without conveying the customer's request to the laboratory system side at the time of receiving the reorder, orally or by writing in a given form, the reception administration can be simplified.

As described above, according to this aspect, since the optical information and the magnetic information recorded on the shooting film can be recorded on the recording medium, the recording medium can be utilized as the means for communicating order contents, exposure information and the like.

The third aspect is a processing laboratory system for performing respective processing for the printing on a printing paper based on the image on the shooting film, using the cartridge according to the first or the second aspect, comprising:

a scanner section for reading out the image data recorded on the shooting film;

an index printing section for preparing an index print based on the image data read out by the scanner; and an image data recording section for recording the image data read out by the scanner in the recording medium provided in the cartridge.

According to the third aspect, it is necessary to partly modify the laboratory system in order to effectively utilize the cartridge having the recording medium attached therein. That is to say, it is necessary to add a system for recording the digital data of the index image on the recording medium.

Here, since each frame image is digitally read with an existing scanner of the laboratory system at the time of preparing the index print, this data is utilized. Basically, the digital data for the index print has a low resolution. However, it is to decide a format or the like to obtain a composite photograph of characters, illustrations and/or the like that the image read out from the recording medium is used, therefore, images with high resolution are not necessary.

In the laboratory system, the image data recording section is provided for recording the digital data on the recording medium. When a customer requests printing with an old-type cartridge (having no recording medium), the customer is asked if he/she wants to change it to a new-type cartridge (having a recording medium) at the time of requesting printing. When the customer wants to change the old-type cartridge to the new-type one, and they want the digital data to be input to the latter, the shooting film is accommodated into the new-type cartridge after the laboratory processing of the shooting film has been completed, as well as the digital data is recorded on the recording medium by the image recording section, then the film is returned to the customer. At this time, the optical information and the magnetic information recorded on the shooting film may be simultaneously recorded on the recording medium by the image data recording section.

In a case that the old-type cartridge has been changed to the new-type one, the ID is read from the shooting film to be accommodated in the new-type cartridge and this ID is recorded (printed) on a portion of the outer periphery of the new-type cartridge, thereby the next reception (of reorder or the like) can be performed with the same configuration as that of the old-type cartridge.

As described above, according to this aspect, by recording the digital data of images which have been recorded on the shooting film in the cartridge on the recording medium provided in the cartridge, the customer can freely read and process it, and by writing a processed layout or format in the recording medium, an order form can be prepared in association with the digital data which has been preliminarily recorded on the recording medium.

The fourth aspect is an image data recording method performed with the laboratory system of the third aspect, comprising the steps of:

reading out the image data for the index print from the shooting film accommodated in the cartridge having no recording medium in the scanner section;

storing the read-out image data for the index print together with the identification mark for specifying the shooting film in the laboratory system; and when the film is loaded in a cartridge having a recording medium, verifying the film with the identification mark, reading out the stored image data, and recording the read-out data on the recording medium.

According to the fourth aspect, for example, when a printing with film processing is requested, there may be a case in which a cartridge does not have a recording medium. At such an occasion, the cartridge can be changed to one having a recording medium according to the desire of the customer, which is one of the advantages of the APS. Furthermore, when it is desired to input the image data for the index print on the recording medium, the image data is stored temporarily in the laboratory system. At this time, it is stored together with an identification mark identifying the shooting film.

Thereafter, when a cartridge (having a recording medium) for accommodating this shooting film is decided, the identification mark identifying the shooting film is read (for example, the information optically recorded is read), then the image data stored together with the identification mark corresponding thereto is read to be stored on the recording medium.

As described above, the image data for the index print corresponding to the images which have been recorded on the shooting film can be surely recorded on the recording medium, based on the identification mark, at the time of re-loading the shooting film in the cartridge.

According to a fifth aspect, in the fourth aspect, the identification mark identifying the shooting film is provided on the cartridge having a recording medium in which the shooting film is accommodated.

According to the fifth aspect, by providing the identification mark (for example, printing) on the cartridge having a recording medium in which the shooting film has been re-accommodated, apparently the change of cartridges cannot be found, and there is no sense of incompatibility. Therefore, at the time of the reorder in the future, it can be handled normally.

The sixth aspect is a camera loaded with a cartridge which accommodates a shooting film therein and is provided with a recording medium, at least electrically connectable contact of the recording medium being exposed on the outer surface of the cartridge, and a recording section for recording the information indicating printing conditions on the printing paper being provided in the recording medium.

According to this aspect, when the information indicating the printing conditions is recorded on the recording section of the recording medium, only by bringing a terminal into contact with the electrically connectable contact, a reading and writing the information can be effected, hence a reading and writing mechanism can be easily provided in the camera.

The information indicating the printing conditions is firstly the information indicating the composition of a plurality of shot images, and by specifying images on the shot film and recording them as a composite image together with the layout information for the composition or the like according to need, images different from the shot images and meaningful to the customer can be obtained.

The second information which specifies the printing conditions is the information indicating the composition of the shot images and characters or illustrations, and can be utilized, for example, for making a cover of an album or a headline.

By recording on the recording medium the information indicating the printing conditions which is a relatively large volume of information (which cannot be dealt with an optical information recording), the explanation or the like regarding the printing conditions is not necessary at the time of receiving the order on the laboratory system side, hence the reception procedure is simplified.

In accordance with a seventh aspect, not only the information indicating the printing conditions but also the information indicating the aspect ratio of the print, and/or the information instructing to display the shooting date and the shooting time on the respective prints can be recorded, as the information recorded on the recording medium.

According to this aspect, in addition to the information of the aspect ratio which is essential for the print, service information such as the shooting date and the shooting time can be recorded on the recording medium. Moreover, by recording the information of contents of the order (normal printing or special printing), at the time of giving the order, it is not necessary for the customer to instruct orally or write in the form, thereby the reception procedure is further simplified.

In accordance with an eighth aspect, in the sixth or the seventh aspect, the camera is such a simple camera as a one-time use camera or a film with a lens.

According to this aspect, normally, if the camera is an expensive camera, it can easy be provided with a mechanism for magnetically recording on the magnetic recording layer (a magnetic head, a magnetic head controller, a mechanism for stably feeding a film, and the like). Therefore, the camera of the sixth or the seventh aspect is effective, as the camera becomes simpler like a simple camera such as LF (one-time use camera such as a film with a lens) which does not include the mechanism for magnetic recording as described above.

In accordance with a ninth aspect, in the sixth aspect, a camera has a function for composing each shot image and illustrations and/or characters, and is provided with an aperture section for masking an area for composing or inserting illustrations and/or characters.

According to the ninth aspect, when it is decided in advance to compose the shot image and an illustration and/or characters at the time of shooting (according to the intention of the shooter), the area where the illustration and/or characters are composed or inserted is masked originally with the aperture section. This area masked by the aperture section may be variable in position and size. However, when the mechanism is provided in a cheap camera, for example, of the eighth aspect, the position and size may be fixed.

Since the area for illustration and/or character is kept in a non-exposed state due to the presence of this aperture section, it becomes possible to compose the shot image and the illustration and/or characters, i.e., insert the illustration and/or characters in the image, with an analogous work.

As described above, with the camera according to any one aspect of the above-mentioned sixth to ninth aspects, information such as printing instruction or the like can be easily recorded on the recording medium provided in the cartridge without obstructing the feeding of the shooting film.

A tenth aspect is a photograph processing method in which the shooting film shot with the camera of any one of the sixth and the seventh aspects is developed and each image of the developed film is printed on a printing paper, comprising the steps of:

converting each image of the film developed into digital image data;

reading at least the information indicating the printing conditions from the recording medium provided in the cartridge;

performing one of composing a plurality of the digital image data, composing the digital image data and illustrated image data, and composing the digital image data and character data, according to the read-out printing conditions; and printing an image on a printing paper according to the composed data.

According to this aspect, the processing in the laboratory system is established when the information or the like indicating the printing conditions is recorded on the recording medium.

That is to say, by converting each image developed into the digital image data, image processing such as composing a plurality of images, scaling each image for composing the image and an illustration(s) and/or a character(s), trimming, blanking (to obtain an overlapped printing image at the time of composing the image with a illustration(s) or a character (s)) and the like becomes easy, based on the information indicating the printing conditions recorded on the recording medium.

In accordance with an eleventh aspect, as in the tenth aspect, the photograph processing method further comprises a step for copying and recording the printing information which has been recorded on the recording medium attached in the cartridge, in the magnetic recording layer of the shooting film accommodated in the cartridge.

According to the eleventh aspect, the information recorded on the recording medium is copied in the magnetic recording layer, thereby the information recorded in this magnetic recording layer can be used as the backup information. Therefore, even if the cartridge and the shooting film are separated during the laboratory processing and cannot be verified, by reading the information from the magnetic recording layer, the information can be recognized.

Furthermore, even with a processing laboratory apparatus having no function for reading the information from a recording medium, the information can be read from the magnetic recording layer.

In accordance with a twelfth aspect, in the photograph processing method of the eleventh aspect, copying or recording is performed by a device for separating the film from the cartridge or a device for converting each image developed into the digital image data.

According to this aspect, by adding a stage for performing copying or recording in the magnetic recording layer to either one of these devices, copying or recording on the magnetic recording medium can be performed by a simple modification without adding a new step.

In accordance with a thirteenth aspect, in the photograph processing method of any one of the tenth to twelfth aspects, the photograph processing method is applied for every cartridge, and means for reading the information recorded on the recording medium is provided in a film carrier which pulls out the shooting film from the cartridge and guides it to the printing position.

According to this aspect, in a so-called mini-laboratory system in which the photograph processing method of this aspect, that is, printing processing is performed in a cartridge unit, the means for reading the information recorded on the recording medium provided in the cartridge is arranged in the film carrier for sequentially positioning the respective image frames in the printing position. That is to say, the cartridge is loaded in this film carrier, and for example, before pulling out the shooting film, the printing information is read from the recording medium. Hence, the information can be quickly reflected at the time of printing, without verifying the shooting film and the read-out printing information.

Furthermore, every time one shooting film has been completed, new information can be written in the recording medium.

In accordance with a fourteenth aspect, in one of the tenth to thirteenth aspects, reading the printing conditions from the recording medium is performed either in a condition where the shooting film has been completely accommodated in the cartridge or in a condition where the shooting film has been completely detached from the cartridge.

According to this aspect, when the information is read from the recording medium, the cartridge must be held. However, while the shooting film is being pulled out of the cartridge or rewound therein, if it is tried to effect an electrical connection of the recording medium of the cartridge to a laboratory system, the cartridge is pushed in one direction within the laboratory system, thereby the shooting film may move in a zigzag direction. Therefore, if the electric connection is made either in a condition where the shooting film has been completely accommodated in the cartridge or in a condition where the shooting film has been completely detached from the cartridge, the information can be surely read out without causing the zigzag movement of the shooting film.

In accordance with a fifteenth aspect, a photograph processing method in which using the cartridge loaded in the camera of any one of the sixth to ninth aspects, each processing of receiving the cartridge, attaching and detaching the shooting film to/from the cartridge for the development, developing the shooting film, effecting printing on a printing paper based on each image visually developed on the shooting film, and preparing a index print is performed, as well as the cartridge, the shooting film, the printing paper, and the index print are verified based on the identification information attached to them, respectively, and returned to a customer, comprising the steps of:

reading the printing conditions from the recording medium provided in the received cartridge;

recording the read-out printing conditions together with the identification information identifying the shooting film;

deciding if the printing according to the printing conditions is possible or not, in the printing processing; and if the printing is possible, performing the printing processing based on the information recorded on the recording medium, and if the printing is not possible, recording in the recording medium the information indicating that the printing is not possible.

According to this aspect, the processing in the laboratory system in the case where the printing conditions are recorded on the recording medium can be performed with the current laboratory system.

That is to say, at the time of receiving or after receiving the cartridge, the printing conditions are read from the recording medium provided in the cartridge. The read printing conditions are recorded together with the ID of the shooting film. Thereby, in either process or step, the printing conditions can be searched using the ID as the key word.

Here, it is decided if on the printing conditions which have been read out the printing can be conducted or not in the printer section of the current laboratory system. That is to say, an image where an illustrations and/or characters are mingled with the image which has been recorded on the shooting film cannot be processed with an analog printer, that is, a type of printer in which each image of the shooting film is printed on a printing paper through exposing light transmitting the image. Therefore, with regard to the one in which such a printing is not possible, the information indicating that the printing is not possible is recorded on the recording medium (for example, setting a flag specified in advance).

Moreover, with regard to the one in which such a printing is possible, the printing is performed in the same manner as the current printing processing.

As described above, it is decided if the processing with the current laboratory system can be performed or not based on the information which has been recorded on the recording medium, and if not, the information indicating that the processing cannot be performed is recorded on the recording medium, and for example, the film is sent to another laboratory system where the processing can be conducted, hence the processing can be performed with the current laboratory system without a sense of incompatibility.

In accordance with a sixteenth aspect, in the fifteenth aspect, the photograph processing method further comprises a step of informing to the verifying process that the printing cannot be performed, when the printing is not possible.

According to this aspect, the cartridge for which it is decided on the basis of the information which has been recorded in the recording medium of the cartridge that the printing is not possible is sent to the verifying process which is the final process. Therefore, in this verifying process, it is necessary to recognize that the cartridge is not printable. Therefore, when the information that the printing is not possible is recorded on the recording medium, the information which has been recorded in the medium is transferred to the verifying section. Thereby, the cartridge for which the printing can be conducted can be picked up at the verifying section.

In accordance with a seventeenth aspect, as in the fifteenth or the sixteenth aspect, when the recording medium in the cartridge cannot be used, or when a cartridge which does not have a recording medium is included in cartridges having a recording medium, the information that the recording medium is not provided in the cartridge or the information that the recording medium in the cartridge cannot be used is recorded together with the identification mark of the shooting film, and the printing is performed based on the magnetic information recorded in the magnetic recording layer provided on the shooting film or the optical information optically recorded.

According to this aspect, in the current laboratory system, a cartridge having no recording medium may be naturally received. Moreover, even if the cartridge is provided with the recording medium, this recording medium may not be read due to a failure or the like. In such a case, the information that the recording medium cannot be used is recorded on the laboratory system side, and the printing is performed based on the magnetic information recorded in the magnetic recording layer provided on the shooting film. Thereby, the laboratory processing cannot be obstructed.

In accordance with an eighteenth aspect, is in one of the fifteenth to seventeenth aspects, the information read out from the recording medium attached to the cartridge or the information read out from the magnetic recording layer is stored in an information recording card which is sent with the accepted shooting film through each process, this information recording card is set in the scanner section which reads each image recorded on the shooting film and obtains the digital data for the index print, and the information read out from the recording medium provided in the cartridge or the information read from the magnetic recording layer is read from the information recording card, based on the identification mark of the cartridge or the identification mark of the film.

According to this aspect, the information recorded on the recording medium provided in the cartridge is read by the scanner section via the information recording card such as an LSI card or the like. This information recording card is sent to each process together with the shooting film, therefore the information can be easily read based on the film ID.

In accordance with a nineteenth aspect, in one of the fifteenth to the eighteenth aspects, the information read from the recording medium attached to the cartridge or the information read from the magnetic recording layer is transmitted to the scanner section for reading the image recorded on the shooting film and obtaining the digital data for index print through an on-line system, and read based on the identification mark of the cartridge or the identification mark of the film.

According to this aspect, the information read from the recording medium is transmitted to the scanner section through the on-line system, and by reading the film ID of the shooting film arrived at the scanner section, the corresponding information can be easily searched and read.

As described above, with the photograph processing method according to the tenth to the nineteenth aspects, it is decided if the printing can be performed or not based on the information read from the recording medium attached to the cartridge, hence the cartridges are securely sorted, and can be also used in the conventional laboratory system.

BRIEF DESCRIPTION OF THE DRAWINGS

FIG. 1 is a perspective view of a cartridge according to an embodiment of the present invention.

FIG. 4 is an elevation of an index print.

FIG. 7 is a system diagram showing an combination of the IC chip reading/writing apparatus and a personal computer.

FIG. 8 is a structural diagram of a large laboratory system according to a first embodiment.

FIG. 9 is a structural diagram of a minilab system (analog print) according to a second embodiment.

FIG. 10 is a structural diagram of a minilab system (analog print) according to a third embodiment.

FIG. 13 is a system structural diagram for photograph processing according to a fourth embodiment.

FIG. 14 is a system structural diagram for photograph processing according to a modified example of the fourth embodiment.

FIG. 15 is a system structural diagram for photograph processing according to a fifth embodiment.

FIG. 16 is a system structural diagram for photograph processing according to a modified example of the fifth embodiment.

DESCRIPTION OF THE PREFERRED EMBODIMENTS

[First Embodiment]

Figure 2:
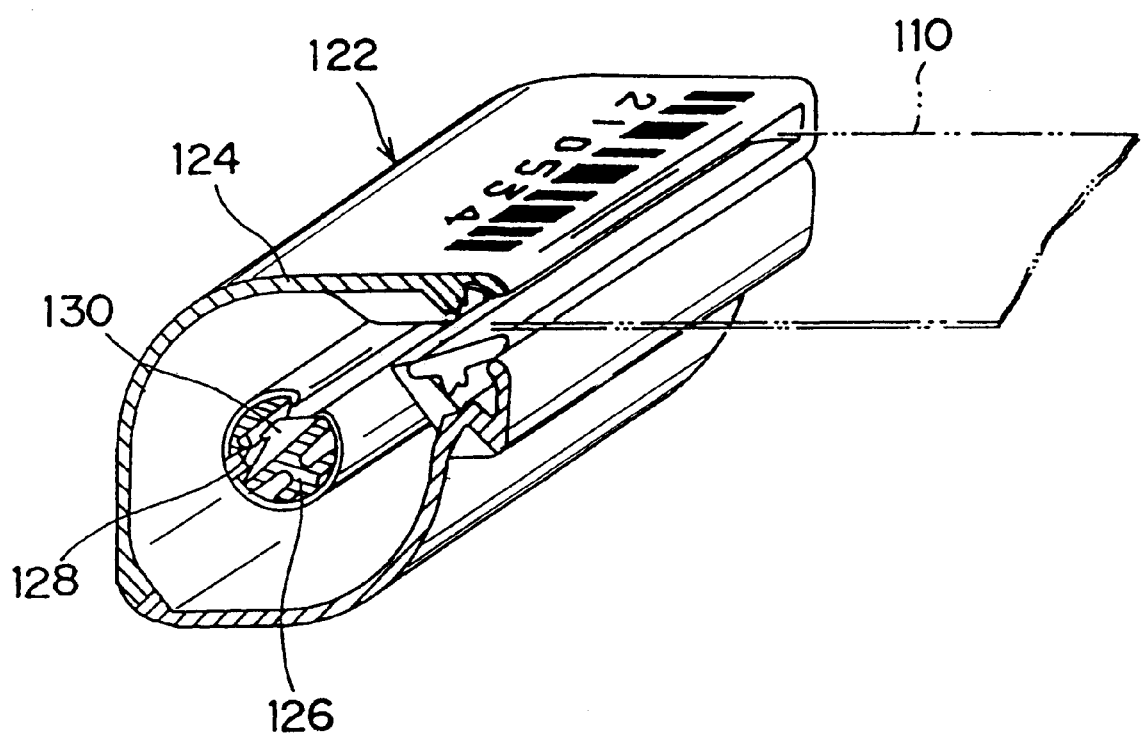
FIG. 2 is a perspective view of the cartridge, with a portion of the casing thereof being cut away in order to show the internal structure of the cartridge.

In FIGS. 1 and 2, a cartridge 122 according to an embodiment of the present invention is shown.

In a casing 124 of the cartridge 122, a spool 126 for winding a negative film 110 (see FIG. 2) in a layered or rolled form and accommodating it is arranged.

Figure 3:
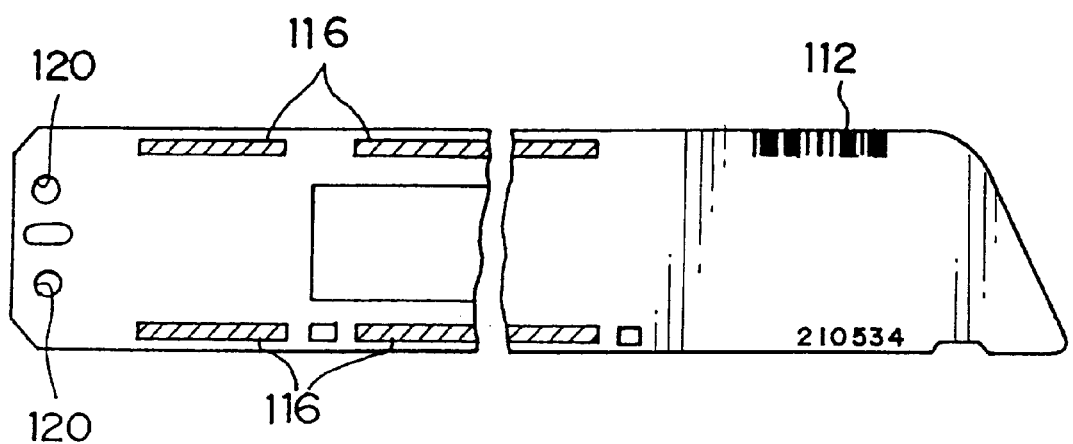
FIG. 3 is a plan view of an negative film (corresponding to APS).

As shown in FIG. 3, the negative film 110 is provided with a magnetic recording layer 116. In this negative film 110, an optical information (bar code 112) is recorded, and this bar code 112 indicates a negative film ID for the negative film 110 (hereinafter referred to as "film ID").

As shown in FIG. 2, in the spool 126, a breakthrough 128 in a form of slit is formed along the axial direction, and a projecting claw 130 is formed in the inner periphery thereof. This projecting claw 130 is fitted to the hole 120 (see Fig. 3) of the negative film 110, thereby the rear end portion of the negative film 110 is connected to the spool 126, and wound in a layered form. Furthermore, in the outer periphery of the cartridge 122, a cartridge ID is preliminarily recorded with a bar code and characters (figures) (cartridge ID). Basically, this cartridge ID and the film ID coincide with each other.

The axial ends project toward the outside of the casing 124, and by rotating the axial ends, the negative film 110 can be put into/out of the cartridge 122.

Here, as shown in FIG. 1, an IC chip 100 as a recording medium is embedded in the cartridge 122 of this embodiment. In this IC chip 100, a plurality of terminals 102 (in this embodiment, 6 terminals) are provided, and the body of the IC chip 100 is embedded in the cartridge 122, but the terminals 102 are exposed on one end face of the cartridge through rectangular holes 104 provided corresponding to the respective terminals 102.

On the IC chip 100, the digital data of images recorded on the negative film 110 accommodated in the cartridge 122 (hereinafter referred to as the digital image data) are recorded. The digital image data is identical with the data read for preparing a index print in an scanner section 210 (see FIG. 8) of a processing laboratory system described later, and has a relatively low resolution. Incidentally, as shown in FIG. 4, the index print 106 is in a form that the images recorded on the negative film 110 have been arranged in a matrix to be recorded on a sheet of paper, and utilized when prints are re-ordered or the like.

Furthermore, on this IC chip 100, it is possible to record edited data which a customer freely has edited and processed, format data of the image data, ordering data and the like, other than the above-mentioned digital image data.

Figure 5:
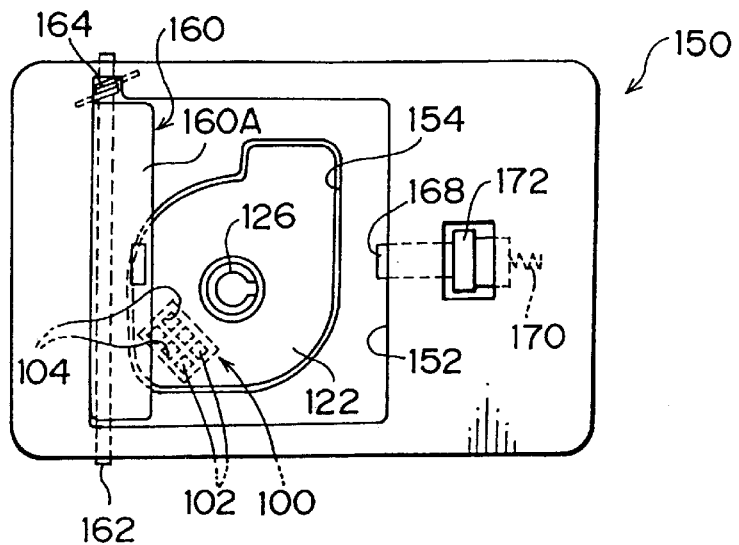
FIG. 5 is a plan view of an IC chip reading/writing apparatus according to the embodiment of the present invention.
Figure 6:
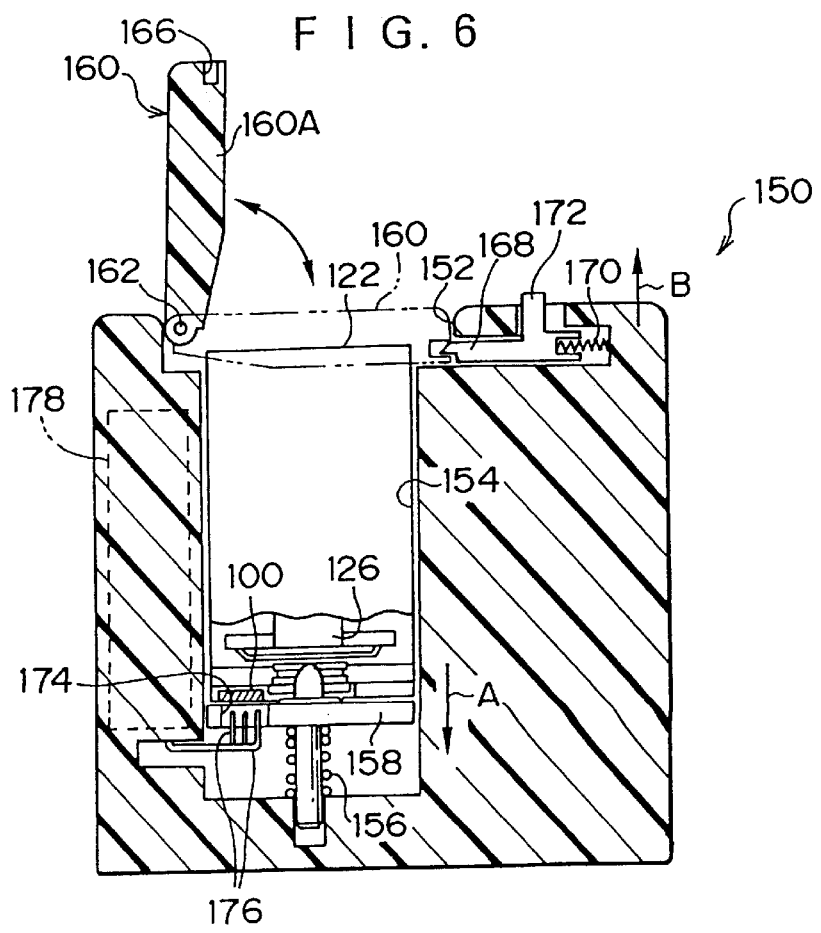
FIG. 6 is an elevation of the IC chip reading/writing apparatus according to the embodiment of the present invention.

The read and write of the data from/to this IC chip can be performed with an IC chip data read/write apparatus 150 shown in FIG. 5 and FIG. 6.

As shown in FIG. 5 and FIG. 6, the IC chip read/write apparatus 150 is provided with a cartridge loading port 152. This cartridge loading port 152 is an opening end of a loading section 154, and is in the same shape as the shape seen from the end face of the cartridge 122 (from the axial direction of the spool 126). Moreover, the inner configuration of the loading section 154 has a shape corresponding to the contour of the cartridge 122, such that only by loading the cartridge 122, while holding downward one end face on which the terminal 102 of the IC chip 100 is exposed, the cartridge 122 is supported such that a portion thereof is in a slightly projecting state (temporarily positioning state). That is to say, on the bottom of the loading section 154, a bottom plate 158 supported by a biasing force of a compressed coil spring 156 is arranged, and the cartridge 122 is supported by this bottom plate 158.

In the cartridge loading port 152, a lid 160 which opens and closes the cartridge loading port 152 is provided. This lid 160 is a hinge-type, and rotatable around a pin 162, and urged with a torsional coil spring 164 in the opening direction. The back side of the lid 160 (the face opposite to the cartridge 122) is a pushing section 160A for pushing the cartridge 122 into the loading section 154. Therefore, the lid 160 is rotated around the pin 162 to close the opening of the loading port 152, thereby the pushing section 160A pushes the cartridge 122. By this pushing force, the bottom plate 158 moves in the lowermost direction of the loading section 152, against the biasing force of the compressed coil spring 156 to accurately position the cartridge 122 in a desired position (main positioning).

The lid 160 is provided with a rectangular hole 166 at the side face opposite to the side face in the vicinity of the opening of the cartridge loading port 152. On the apparatus body opposite to this rectangular hole 166, an engaging claw 168 is projecting by the biasing force of the compressed coil spring 170. The engaging claw 168 has a tip portion in a form of inclined plane. When the lid 160 is closed, the engaging claw 168 is drawn back, and by corresponding to the rectangular hole 166, it projects into the hole 166 to hold the lid 160 in a closed state. In the middle portion in the moving direction of the engaging claw 168, an eject knob 172 projects in the direction orthogonal to the moving direction (in the direction of an arrow B in FIG. 6), and by operating this eject knob 172 in the drawing back direction of the engaging claw 168, the holding of the lid 160 is released, and the lid 160 is opened by the biasing force of the torsional coil spring 164.

The bottom plate section 158 is provided with a rectangular hole 174, and tip portions of movable terminals 176 in the same number (6 pieces) as the number of the terminals of the IC chip 100 are exposed therefrom (in FIG. 6, only three of them are shown). Each of the movable terminals 176 is bent in a substantially L shape, and the base portion thereof is connected to the control section 178 for recording the data in the IC chip 100 or reading the data from the IC chip 100. Each movable terminal 176 has an elastic force.

When the bottom plate section 158 is lowered due to the pushing force of the cartridge 122 ( in the direction of an arrow A in FIG. 6), the terminals 102 of the IC chip 100 push the movable terminals 176. At this time, the movable terminals 176 are bent due to the elastic force, to be kept in contact with the terminals 102. That is to say, the contact pressure is held to more than a predetermined level due to this elastic force, thereby an electrically desirable connected state can be maintained between the terminals 102 and the terminals 176.

As shown in FIG. 7, the above-mentioned IC chip read/write apparatus 150 is used so as to be connected to a personal computer 180 by a customer who received a cartridge 122 in which a negative film 110 developed by a printing with film processing or the like is accommodated.

That is to say, when a format of a greeting card such as a New Year card is prepared based on one image recorded on the negative film 110 on the personal computer 180 (see a monitor screen 180A of the personal computer 180 shown in FIG. 7), one index image of the index images recorded on the IC chip 100 is taken in by the IC chip read/write apparatus 150. Since the index image is digital data, though the resolution is lower than the original image thereof(an image recorded on the negative film), it is easy to take in the image, and it is the image sufficient for preparing the format.

Therefore, by recording the digital data of the index print in the IC chip 100, and utilizing the IC chip read/write apparatus 150, the bothersome work can be eliminated, such as taking out the negative film 110 from the cartridge 122, selecting a desired image from the images arranged in one line, reading it by a scanner or the like, converting it to the digital data, and taking it in the personal computer 180.

A predetermined format information prepared with the personal computer 180 (in the form of a greeting card) can be recorded on the IC chip 100 together with the frame number of the image to be used. Therefore, it is not necessary to request the format information prepared with the personal computer 180 to the laboratory system through another recording medium in which the format information has been recorded or to explain it orally to a counter person.

(Summary of a Large Scale Processing Laboratory System)

In FIG. 8, a process diagram of a large laboratory system according to this embodiment is shown. With this large laboratory system, processing for normal print and processing for special print can be performed, and cartridges 122 are sent to the reception/sorting section 200. Incidentally, the processing for normal print means printing with film processing and re-ordered printing, and the special printing means composite photographs with characters such as a shot date and a shot place and illustrations. In Table 1 below, contents of processing which can be performed with the normal printing and contents of processing which can be performed only by the special printing in this embodiment are shown.

TABLE 1

| Processing possible with the normal printing | Processing possible only with the special printing |
| --- | --- |
| C/H/P printing<br>Back printing of the shot date and the shot time | Front printing of the shot date and the shot time<br>Composite photograph including characters/illustration/title<br>Post card (composition of characters and an image)<br>Album printing (image layout, character) |

(Reception/Sorting Section 200)

With this reception/sorting section 200, the cartridges 122 are sorted according to the normal printing processing or the special printing processing.

Furthermore, with the reception/sorting section 200, it is necessary to decide if each received cartridge 122 is with the IC chip 100 or not, if a customer wants to change the cartridge 122 to one with the IC chip 100 or not, and if the customer wants the digital data of the index print 106 to be input on the IC chip 100. Table 2 below shows the case where the cartridges 122 are sorted depending upon if each cartridge 122 has the IC chip 100 or not. This sorting is different from the sorting at the time of receiving the cartridges described later.

TABLE 2

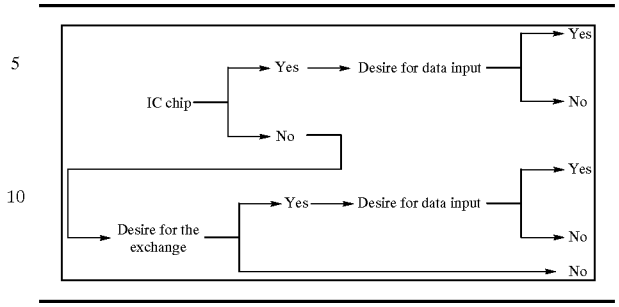

Based on the above-mentioned sorting, in the reception/sorting section 200, cartridges are sorted into 5 types of from No. 1 to No. 5 shown below, and sent to a detaching/splicing section 202. With regard to the cartridge 122 for special printing, by incorporating the minilab digital printing system described later in the large laboratory system, the processing becomes possible, therefore the description thereof is omitted.

(Detaching/Splicing Section 202)

The detaching/splicing section 202 performs a process or step to take out the negative film 110 from the cartridge 122, as well as detach the rear end portion thereof from the spool 126, splice (join) a plurality of negative films 110 longitudinally, to prepare a rolled film. In addition, undeveloped negative films 110 (printing with film processing) and developed negative films 110 (re-ordered printing) are sorted and spliced in a unit of the sorted films, respectively.

This detaching/splicing section 202 is provided with an IC reader 204. This IC reader 204 has a function similar to the reading function of the IC read/write apparatus 150 which is possessed by the customer described above.

This IC reader 204 checks the sorting first, for example, deciding whether there is mixed a negative film 110 for the special printing in the films for the normal printing, in spite of having formed a roll film only with the negative film 110 for the normal printing.

Next, the IC reader 204 reads the information such as the print size information, the print frame information, the number of prints and the like in the normal printing.

In the detaching/splicing section 202, the cartridge ID is read from the cartridge 122 separated from the negative film 110, a set of the cartridge ID and the information read from the IC reader 204 is prepared, and the information is stored in the LSI card (not shown) passing through each process.

In the case of the re-ordered print (it belongs in the normal print), there are the cartridges 122 with the IC chip and the cartridges 122 without the IC chip. Therefore, in the case of the cartridge 122 without the IC chip, since the order contents are recorded in the magnetic recording layer 116, a flag instructing to read the order contents in the magnetic recording layer 116 is set.

Furthermore, when the cartridge 122 (negative film 110) selected for the processing is for the special printing, the format information other than the order information are recorded on the IC chip 100. This format information may be stored directly in the detaching/splicing section 202, but a flag may be simply set to show that it is a special printing.

The communication of the information between the respective processes is not limited through the LSI card, and the magnetic recording layer 116 of the negative film 110 may be used, or the information may be sent directly to a predetermined process (generally, the next process) as the on-line data.

In the detaching/splicing section 202, a scrap station 206 is provided for the case where the customer wants the exchange to a cartridge 122 with an IC chip, and the cartridge 122 detached from the negative film 110 is scrapped at this stage. On the other hand, when the exchange is not desired, or when the cartridge is already a cartridge 122 with an IC chip, it is received in the order of reception, in a cartridge magazine (not shown) for every predetermined number, and sent to a verifying section 222 (see FIG. 8) described later.

(Negative Film Developing Section 208)

The undeveloped negative films 110 connected in a roll form are sent to the negative film developing section 208, and in the known negative film developing machine, the negative films 110 are subjected to development processing and set to a scanner section 210 which is the next process.

(Scanner Section 210)

In the scanner section 210, the main work is to digitally read the images recorded on the negative film 110, and the index print 106 is prepared based on the digital data read here.

When the negative films 110 in a roll form are loaded in a predetermined position, they are pulled out from the uppermost layer, and the information recorded in the magnetic recording layer 116 of each negative film 110 or the information recorded from the LSI on the IC chip 100 is read. Furthermore, on the negative film 110, an ID (negative film ID) is optically recorded, and the scanner section 210 reads this optical information (negative film ID). The information is then searched based on this negative film ID. In addition, by this search, not only the corresponding information can be obtained, but also it can be decided whether there is any information recorded on the IC chip 100 in the normal printing, or whether there is a special printing request mixed therein.

In addition, if there is no information for printing in the IC chip 100, the information for printing is prepared based on the information recorded in the magnetic recording layer 116.

Here, the scanner section 210 is provided with an IC storage memory 212, and when there is the information instructing to record the digital data for index print in the IC chip 100, the digital data for index print read together with the negative film ID is stored in the IC storage memory 212. When the above-mentioned reading-out of the image in the scanner section 210 and reading-out of the information are completed, the negative films 110 in a roll form are sent to a printer section 214. Furthermore, the information for printing read from the IC chip 100 or from each magnetic recording layer 116 is transmitted to the printer section 214.

(Printer Section 214)

In the printer section 214, the images recorded on the negative film 110 are printed on a printing paper (not shown). In the case of the printing with film processing, an index print 106 is also prepared for each negative film 110. In the case of re-ordered printing, each of the specified image frames is positioned, and printing is performed for the specified number. Moreover, processing which can be effected in the printing with film processing (according to Table 1 described above) is performed.

The negative films 110 in a roll form whose printing processing have been completed are fed to a desplicer/reattacher section 216 which is the next process.

(Desplicer/Reattacher Section 216)

The cartridge magazine is sent to the desplicer/reattacher section 216, where the negative film ID which is recorded on each negative film 110 of the negative films 110 in a roll form is read out, and while verifying with the cartridge ID recorded in the cartridge 112, the negative film 110 is accommodated in the corresponding cartridge 112.

Here, the desplicer/reattacher section 216 is provided with an IC writer 218. This IC writer 218 has the same function as the write function of the IC read/write apparatus 150 possessed by the customer described above.

With this IC writer 218, when a cartridge 112 is loaded in the desplicer/reattacher section 216, the digital image data for index print and various information including the negative film ID are recorded on the IC chip 100 provided in the cartridge 112, according to need.

An FID printing section 220 is attached to the IC writer 218. This FID printing section 220 prints the negative film ID recorded on the negative film 110 on the outer surface of the cartridge 112, before a new cartridge 112 with an IC chip is provided to the customer who wants the exchange to the cartridge 112 with an IC chip.

Thereafter, the cartridges 112 accommodated in the cartridge magazine and the cartridge 112 with the IC newly added are received in another cartridge magazine in the order of splicing of the rolled negative films 110.

Thereby, the order of separating the negative films 110 from the rolled coincides with the order of arrangement of the cartridge 112, thus the work is smoothly performed in the desplicer/reattacher section 216.

In this embodiment, after the digital image data for the index is recorded by the IC writer 218 and the FID printing is performed by the FID printing section 220, the cartridge 112 is accommodated in the cartridge magazine and the respective films are reattached to the corresponding cartridges, but the order may be such that a cartridge 112 with an IC chip in which a film has not been loaded is received in the cartridge magazine, and after recording of the digital image data for index by the IC writer 218 and FID printing, the film is reattached to the cartridge 112 with an IC chip.

Here, when a negative film for the special printing gets mixed in the negative films 110 rolled, a flag has been set on the LSI card to show the mixing in the detaching/splicing section 202, thereby at the time of releasing the splicing of this negative film 110, it is informed visually (display or the like) or auditorily (alarm or the like).

(Verifying Section 222)

In a verifying section 222, the negative film 110, the cartridge 112 which accommodates this negative film 110, printing papers, and the index print 106 are all collected, and received in a DP bag (not shown), while being verified based on the ID attached respectively thereto, and returned to the customer.

In addition, in this verifying section 222, after each negative film 110 is separated from rolled films, it is sent to the special printing process. Such a negative film 110 for the special printing which has got mixed in the normal printing can be picked up easily even manually by an operator in the verifying work, because a print (and an index print 106) corresponding thereto does not exist.

The operation flow in the above-mentioned large laboratory system will now be described.

As shown in FIG. 8, there are five types of cartridges 112 to be received by a counter person in normal printing. No. 1 is a cartridge having no IC chip for re-ordered printing which is requested to be returned without IC chip, No.2 is a cartridge having no IC chip for printing with film processing which is requested to be returned without an IC chip, No.3 is a cartridge without IC chip for printing with film processing which is requested to be changed to a cartridge with an IC chip at the time of returning, No. 4 is a cartridge without the IC chip for re-ordered printing which is requested to be changed to a cartridge with an IC chip at the time of returning, and No. 5 is a cartridge with an IC chip for re-ordered printing.

Since No. 1, No. 4 and No. 5 are for re-ordered printing, the films thereof are spliced in the order of reception in the detaching/splicing section 202, and sent to the scanner section 210 in a roll form. No. 2 and No. 3 are for printing with film processing, the films thereof are spliced in the order of reception in the detaching/splicing section 202, and sent to the developing section 208 in a roll form.

Here, with regard to No.3 and No.4, since the cartridges thereof are changed to ones with an IC chip, the shooting cartridge thereof are sent to the scrap station for scrapping after being detached. Moreover, No 1, No. 2 and No. 5 are received in a cartridge magazine and sent to the verifying section 222.

Furthermore, in the detaching/splicing section 202, the information is read from the IC chip provided in each cartridge 122 by the IC reader 204, and the read-out information is transmitted to the scanner section 210.

In the scanner section 210, the magnetic information is read from each of the sent negative films 110 in a roll form. Furthermore, in the case of the printing with film processing, the digital data for preparing the index print 106 is read from all the negative films. On the other hand, in the case of the re-ordered printing, only each cartridge having no IC chip requested to change to a cartridge 122 with an IC chip is selected, the images are read from the corresponding negative film 110 of the cartridge to obtain the digital data for index.

Then, the information for correcting the exposure of the image frame to be printed is obtained and transmitted to the printer section 214, as well as the information for correcting the exposure is written in the magnetic recording layer 116.

In addition, in the scanner section 210, the digital data for the index print is recorded in the IC storage memory 212.

With the printer section 214, each image frame is positioned in the printing position, and the printing processing is performed based on the information for correcting the exposure transmitted from the scanner section 210, and the completed rolled negative films 110 are transferred to the reattaching/desplicing section 216.

To the reattaching/desplicing section 216, the cartridge 122 separated from the negative film 110 has been preliminarily transferred.

Here, in the negative film 110 whose cartridge 122 is to be changed to one with an IC chip, a corresponding cartridge 122 does not exist. Therefore, a new cartridge 122 (with an IC chip) is taken out from a new cartridge stocker 219, the negative film ID recorded on the negative film 110 is printed on the outside of the new cartridge 122 with the FID printing section 218 (or a label on which the negative film ID is printed is attached thereto), and the new cartridge 122 is sent out to the reattaching/desplicing section 216.

Thereby, cartridges 122 are prepared so as to correspond to all the negative films 110.

Hence, each negative film 110 is accommodated in the corresponding cartridge 122, and is sent to the verifying section 222 together with the cartridge 122, the printing papers, and the index print 106. In the verifying section 222, the above-mentioned respective photograph materials (the cartridge 122, prints, and the index print 106) are put in a DP bag and returned to the customer.

As described above, in this embodiment, since the digital data for the index print is recorded in the cartridge 122 with the IC chip, the customer can easily recognize the contents of images recorded on the negative film 110, using a personal computer 180, merely by loading the cartridge 122 in the IC read/write apparatus 150 and reading the data recorded on the IC chip 100, without pulling out the negative film 110 from the cartridge 122.

Moreover, the customer can edit by adding a desired character(s) on a desired image on the personal computer 180, and record or store the edited information in the IC chip 100. Therefore, the customer can request a desired special printing by bringing the cartridge with the IC chip 100 to the laboratory system without explaining orally to a counter person in the laboratory system.

Furthermore, with the laboratory system according to this embodiment, the processing step of this cartridge 122 with the IC has been established, therefore the communication with the customer is also established.

In addition, with the laboratory system, the process or step for changing the cartridge without an IC chip for the normal APS to the cartridge 122 with IC chip has also been established, the cartridge having no IC chip at the time of request can be changed to a cartridge 122 with an IC chip, in response to customers' desires.

[Second Embodiment (Minilab Analog Printing)]

In the above-mentioned first embodiment, a so-called large laboratory system in which the processing of the negative films 110 (development, printing and the like) is performed in a large quantity has been described as an example to explain the processing flow of the cartridge 122 with an IC chip. In DPE shops at street corners, however, a so-called minilab system in which the processing of the negative films is performed in a small quantity has been established.

Basically, the processing of the minilab system is the same as that of the large laboratory system, but the former is partially different from the latter, which will be explained with reference to FIG. 9.

The types of the cartridge 122 (the negative film 110) to be processed are similar to ones used in the first embodiment.

(Reception/Sorting Section 250)

In the reception/sorting section 250, the cartridges 122 are sorted according to the normal printing processing or the special printing processing.

Furthermore, with the reception/sorting section 200, it is necessary to decide if the received cartridge 122 has the IC chip 100 or not, if the customer wants to change the cartridge 122 having no IC chip to one with the IC chip 100 or not, and if the customer wants the digital data for the index print 106 to be input on the IC chip 100.

The cartridges 122 sorted as described above are transferred to a detaching section 252.

(Detaching Section 252)

With the detaching section 252, different from the large laboratory system, it is not necessary to detach all the negative films 110 from all the cartridges 122. Detaching is necessary for only requests for the printing with film processing and only requests for the exchange of a cartridge 122 having no IC chip for a cartridge 122 with an IC chip. In the case where the order is the re-ordered printing and the negative film 110 has already been accommodated in the cartridge 122 with the IC chip, this step is skipped.

In the detaching section 252, a scrap station 254 is provided for the case where the customer wants the exchange to the cartridge 122 with an IC chip, and the cartridge 122 detached from the negative film 110 is scrapped at this stage. On the other hand, when the exchange of cartridges is not desired, or when the cartridge is the cartridge 122 with the IC chip, the cartridges are accommodated in the order of reception, in a cartridge magazine (not shown) for every predetermined number, and transferred to a reattaching section 258 described later.

(Negative Film Developing Section 256)

The negative film 110 detached from the cartridge 122 is sent to the negative film developing section 256, and the development processing is performed with a conventional negative film developing machine, and the developed negative film 110 is transferred to the reattaching section 258 which is the next process.

(Reattaching Section 258)

In the reattaching section 258, the negative film 110 whose development processing has been completed or the negative film 110 whose cartridge 122 is to be changed to one with an IC chip is reattached to the cartridge 122. In this case, the verification of the negative film 110 and the cartridge 122 is performed based on the negative film ID and the cartridge ID recorded on the negative film 110 and the cartridge 122, respectively.

Here, a new cartridge 122 with an IC chip is taken out from a new cartridge stocker 266, the read negative film ID is detached at the detaching section 252, and the information is printed on the new cartridge 122 in the FID printing section 262 to designate it as the cartridge ID, the new cartridge 122 being transferred to the reattaching section 258.

The negative film 110 is transferred to a scanner section 264, which is the next process of the negative film 110, in a state to be accommodated in the cartridge 122. In FIG. 9, the cartridges 122 are classified into the groups of No. 1, No. 2 and No. 5, and the group of No. 3 and No. 4 depending upon the necessity of the exchange of cartridges, but they may be classified into the group of the printing with film processing and the group of the re-ordered printing.

(Scanner Section 264)

In a scanner section 264, the main work is to digitally read the images recorded on the negative film 110, and the index print 106 is prepared based on the digital data read here.

When the negative film 110 is loaded in a predetermined position, it is pulled out from the uppermost layer, and the information recorded in the magnetic recording layer 116 of each negative film 110, the optical information and the information recorded in the IC chip 100 are read.

In addition, if there is no information for the printing in the IC chip 100, the information for the printing is prepared based on the information recorded on the magnetic recording layer 116.

Here, the scanner section 264 is provided with an IC reader 266 and an IC writer 268. When recording of the digital data for the index print in the IC chip 100 as well as reading the information for the printing are desired, the read digital data for the index print together with the optical information and the magnetic information is recorded or stored in the IC chip 100. In addition, the information for the printing read from the IC chip 100 or from the magnetic recording layer 116 is transmitted to a printer section 270. Incidentally, when it is a printing with film processing, the digital data for the index print is transmitted to the printer section 270.

(Printer Section 270)

In the printer section 270, the images recorded on the negative film 110 are printed on a printing paper. In the case of the printing with film processing, the index print is also prepared for each negative film. In the case of re-ordered printing, the specified image frame is positioned, and printing is performed for the specified number. Moreover, processing which is possible in the printing with film processing (according to Table 1 described above) is performed.

The negative film 110 whose printing processing has been completed is transferred to a verifying section 272.

(Verifying Section 272)

In the verifying section 272, the negative film 110, the cartridge 112 which accommodates this negative film 110, printing papers, and the index print 106 are all collected, and received in a DP bag, while being verified based on the ID attached thereto, respectively, and returned to the customer.

In addition, in this verifying section 272, a negative film 110 requested for the special printing which has got mixed in the normal printing can be picked up easily even manually by an operator, because a printing paper (and the index print 106) corresponding thereto does not exist in the verifying work, and the negative film 110 requested for the special printing is transferred to the special printing process.

As shown by the arrows (a solid line indicating the negative film 110, a one-dot chain line indicating the cartridge 122, and a chain line indicating the information) of FIG. 9 which shows the process flow, the negative film 110, the cartridge 122 and the information are processed. The point different from the large laboratory system is that the negative films 110 are processed for each negative film, and other points are almost the same with the processing flow in the large laboratory system.

[Third Embodiment (Minilab Digital Printing)]

FIG. 10 shows a digitized minilab system.

In this digital minilab system, processing for the special print is also possible, and as No. 6, a special printing request is added. Incidentally, the same part as that shown in the above second embodiment is given the same reference numeral, whose explanation will be omitted.

In the large laboratory system of the first embodiment and the analog minilab system of the second embodiment described above, the picked-up cartridge for the special printing is processed in the system of this third embodiment. That is to say, even in the large laboratory system, considering that the number of requests for the special printing is small, the digital minilab system is applied to the special printing.

In the digital minilab system shown in this third embodiment, the point different from the analog minilab system of the second embodiment is that the resolution to be read in the scanner section 264 is high, and that the read data of each image frame (digital data) can be transmitted to the digital printer section 274 to be printed digitally on a printing paper.

As one example of the digital printing, a laser printer is popular in which a laser beam is scanned in a fast scanning direction by a polygon mirror, while a printing paper is moved in the slow scanning direction so that writing is performed on a printing paper. By using such a laser printer, it is easy to correspond to the image expressed with characters and an illustration overlapped on the image, as shown in FIG. 7.

[Fourth Embodiment]

In a fourth embodiment, the cartridge and the film used in the first embodiment are used. Therefore, with regard to these cartridge and film, the same reference numerals as in the first embodiment will be used and their detailed explanation will be omitted.

In this embodiment, the printing information of the images recorded on the negative film 110 accommodated in the cartridge 122 is recorded in the IC chip 100.

In this IC chip 100, it is also possible to record edited data which a customer freely has edited and processed, format data of the image data, ordering data, printing conditions and the like.

As the printing conditions, there can be mentioned a composition of shot images, a composition of the shot image and an illustration and/or characters, or the like (described later). Furthermore, as one of the printing conditions which has been used most frequently, there can be mentioned an aspect ratio at the time of printing. It will be explained using an example of shooting of a print having a different aspect ratio. In the aspect ratio, there area standard size (H size), aclassic size (C size), and a panorama size (P size), which can be selected at the time of printing. In addition, the H size is also referred to as a vigorous vision size.

That is to say, the image frame is unified to the H size, but when the C size is selected, the right and left end portions of the image frame are masked by a predetermined area and printed. When the P size is selected, the upper and lower end portions of the image frame are masked by a predetermined area and printed. These printing conditions are recorded in the IC chip 100.

Here, it is intended for a one-time use camera, or a film with a lens, 500 (hereinafter referred to as LF 500) shown in FIG. 11A. Conventionally, in this LF 500, for example, when either of a standard size or a panorama size is to be decided, an optical mark has been attached on the negative film 110 at the time of shooting, later change has been impossible. In addition, in the LF 500, the mechanism for recording the printing conditions using a magnetic recording layer 116 cannot be used due to the increase of the number of parts, due to the complexity of the mechanism and due to the cost. On the contrary, in this embodiment, the LF 500 has a function for recording the printing conditions in the IC chip 100.

Figure 11A:
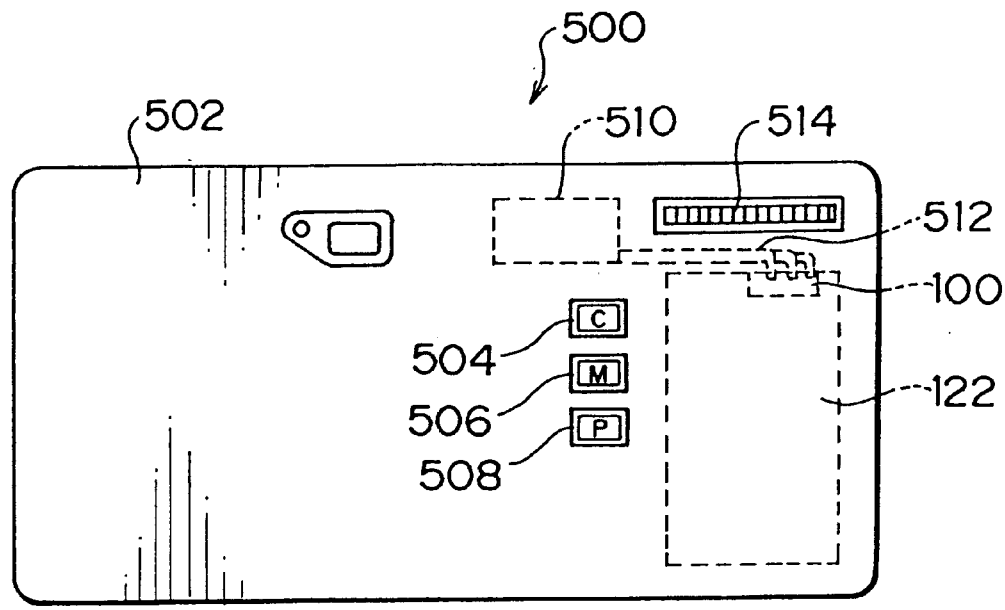
FIG. 11A is back view of an one-time use camera and FIG. 11B is a recording circuit diagram to an IC chip mounted to the one-time use camera.

As shown in FIG. 11A, on the back side of a casing 502 of the LF 500, there are provided operation buttons 504, 506 and 508 expressed as "C", "H" and "P" which represent the initial of each size, respectively. These operation buttons are respectively connected to an IC chip recording circuit 510 provided inside of the LF 500. To the IC chip recording circuit 510 is supplied power from the power supply for the flash lamp. Furthermore, from the IC chip recording circuit 510, pin-type movable terminals 512 corresponding to each terminal of the IC chip 100 project. The tip portions of these movable terminals 512 are bent substantially orthogonally, and these movable terminals 512 themselves have the elastic force. These tip portions contact with respective terminals of the IC chip 100 in the cartridge 122 loaded in the casing 502, to maintain the predetermined contact pressure with the elastic force.

Figure 11B:
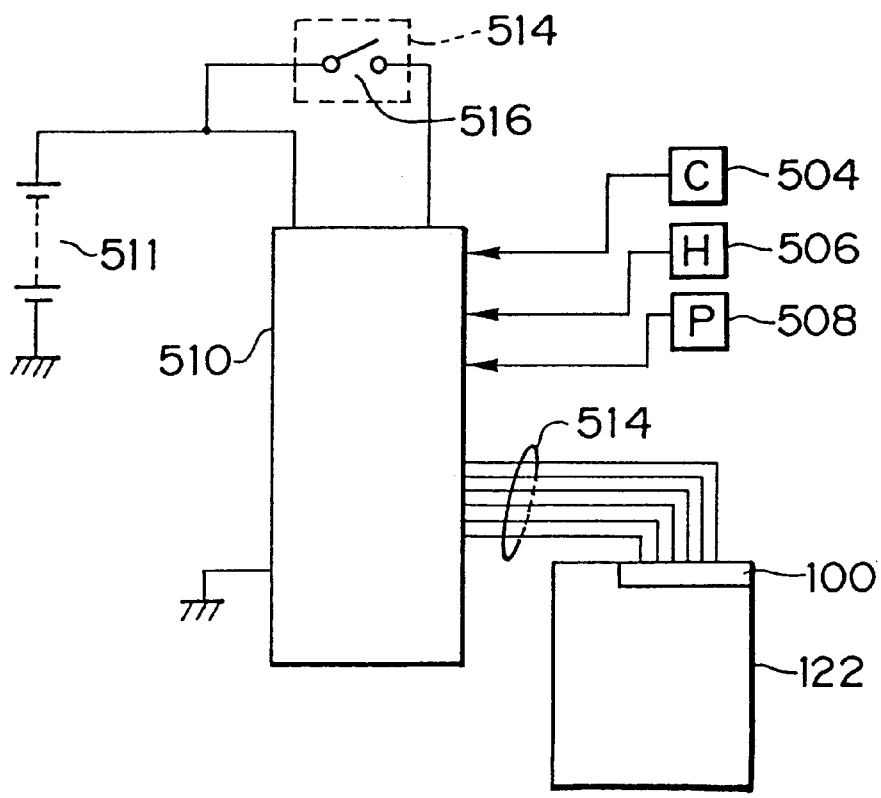

Furthermore, to the IC chip recording circuit 510 is connected one end of a frame number recognition switch 516 (see FIG. 11B) which switches OFF→ ON→ OFF during one operation of a film winding dial 514. The other end of this frame number recognition switch 516 is connected to the power supply 511, thereby a pulse signal is input from the frame number recognition switch 516 to the IC chip recording circuit 510, in response to the winding of the film.

The film winding dial 514 is set in advance according to the manufacturer or the type of the LF 500, such that at the time of purchase of the LF 500, the negative film 100 is in a completely pulled out state, and it is operated until the final frame is positioned in the optical axis for shooting, and thereafter it is operated for each frame, and finally it is operated until the negative film 110 is completely accommodated in the cartridge 122, hence the frame number on the optical axis for the current shooting can be recognized based on the pulse signal input to the IC chip recording circuit 510.

When either of the operation buttons 504, 506 or 508 is operated, the frame number on the optical axis for the current shooting is recognized based on this operation, and this frame number and the printing conditions (the aspect ratio) corresponding to the operated one of the operation buttons 504, 506 and 508 are recorded on the IC chip 100 via the movable terminals 512. When the next image frame is fed at the shooting position without the operations buttons 504, 506 and 508 operated, it is a matter of design and is not limited whether recording is always effected as the H size, or the size corresponding to the operation button 504 (or 506 or 508) which was last operated is maintained. If it is assumed that when the operation buttons 504, 506 and 508 are not operated, it is decided that the recording is effected as the H size, it is required to specify the matter as the notabilia, and when the button 504 (or 506 or 508) which was last operated is maintained, it is required to display the maintained size.

The construction in which composition of images, or the composition of an image and an illustration and/or characters described above as the printing conditions is recorded as the information other than the aspect ratio will now be described.

As shown in FIG. 11A, since the 504, 506 and 508 are operated singly, they have a function as specifying the aspect ratio, however, when the operation buttons 504 and 506 are operated simultaneously (or two buttons are operated in the same time), a signal for setting a flag indicating the preparation of the album print 520 (see FIG. 12A) is sent to the IC chip 100, and the indication that there is an album print is recorded therein. Moreover, when the operation buttons 504 and 508 are operated simultaneously, a signal for canceling a flag indicating the preparation of the album print 520 is sent to the IC chip 100, and the indication that there is no album print is recorded therein. Incidentally, since this indication is for the whole one film, it may be provided before the shooting, during the shooting or after the shooting.

Figure 12A:
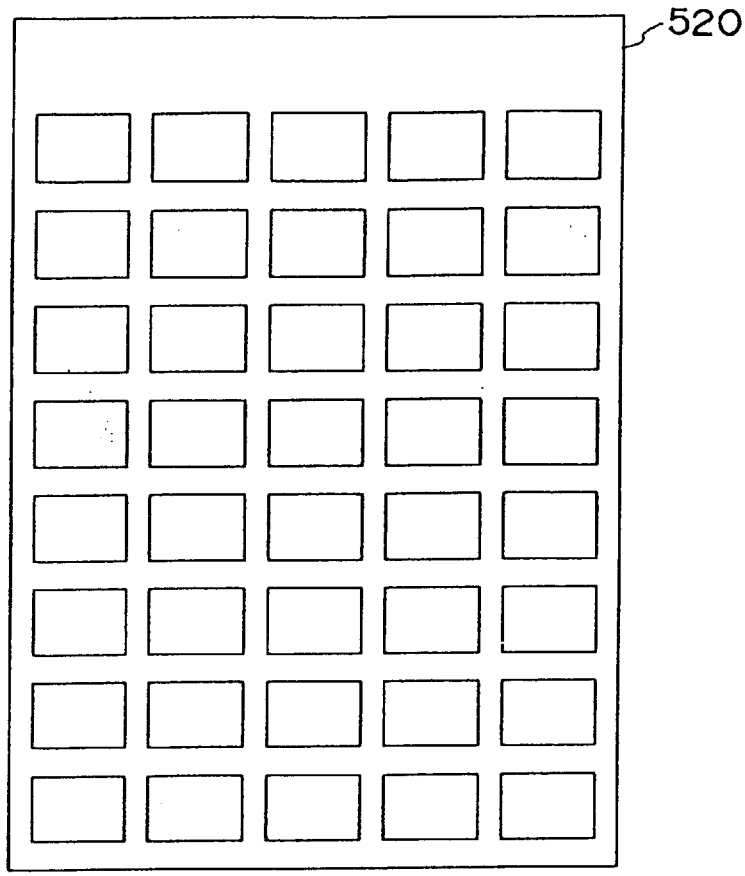
FIG. 12A is an elevation of an album or index print and 12B is an elevation of a composite print.

As shown in FIG. 12A, this album print 520 is a so-called large-sized index print which records all images recorded on one negative film 110 in one sheet of large-sized paper (for example, it may be a photograph size of a quarter, or it may be a size of Japanese Industrial Standard such as A4).

Furthermore, according to this embodiment, by operating the operation buttons 506 and 508 simultaneously, a signal for setting a flag indicating the composite print 522 of the image with the illustration or characters (see FIG. 12B) is sent to the IC chip 100, and the indication that there is a composite print is recorded therein. In addition, when the operation buttons 506 and 508 are operated simultaneously, a signal for canceling a flag indicating the preparation of the composite print 522 is sent to the IC chip 100, and the indication that there is no composite print is recorded therein. This indication corresponds only to the frame to be shot next, and after the indication, an aperture (not shown) intercepts the exposure in a predetermined area on the shooting frame, and this intercepted predetermined area becomes an area to record the illustration and/or characters in the later stage (analog method).

With regard to the illustrations and characters used for a composite print, they are numbered in advance, and a customer can specify a desired illustration and/or character by selecting it from a list showing a correspondence relationship between the illustrations and characters, and the numbers and operating the operation buttons 504, 506 and 508 according to the corresponding number. The correspondence list of the numbers and the illustrations and characters is got hold of on the laboratory system side, and the laboratory system side searches the illustration and/or characters based on the number recorded in the IC chip and prepares the composite print 522.

The illustration and/or characters is designated in such a manner that for example, after operating the operation buttons 506 and 508 (indicating the composite print), within 10 seconds, the operation button 504 serves to input the figure of hundreds in the IC chip 100, the operation button 506 serves to input the figure of tens in the IC chip 100, and the operation button 508 serves to input the figure of units in the IC chip 100, thereby the desired number is input. The contents of input may be displayed in the finder. In addition, this limited period of time (10 seconds) may be indicated by a sound or light.

Figure 12B:

As shown in FIG. 12B, the preparation procedure of the composite print 522 in the above-mentioned analog method is such that before the development the area intercepted by the aperture becomes blank, and on this area the specified illustration and/or characters are printed in the laboratory system, and after the development, the composite photograph is completed on a sheet of printing paper.

In addition, separate from the above-mentioned analog method, the digital method may be carried out in which without using the aperture or the like the shooting is performed on the whole area of the image frame, and the image after the development is digitally read to compose the image with the specified illustration and/or characters. In a case that a plurality of images (not the whole images, but a group of 4 to 5 images) are recorded on one sheet of printing paper, the digital method is advantageous. Either of the analog method or the digital method may be adopted according to the type of the cameras, or functions for implementing the analog and digital methods may be included in the laboratory system.

Furthermore, the instruction for the album print 520 or the composite print 522 has been performed by the operation of the operation buttons 504, 506 and 508 in the above-mentioned embodiment, however, a dedicated operation button may be provided separately.

(Summary of the Large Laboratory System)

In FIG. 13, a process diagram of a large laboratory system according to this embodiment is shown. In this large laboratory system, processing for the normal print and processing for the special print can be conducted, and the cartridge 122 is sent to the reception/sorting section 700. Incidentally, the processing for the normal print means printing with film processing and re-ordered printing, and the special printing means photographs composed with characters such as the shot date and the shot place and illustrations.

As the processing which can be effected with the normal printing, there can be mentioned C/H/P printing, back printing of the shot date and the shot time or the like, and as the processing which can be performed only with the special printing, there can be mentioned front printing of the shot date and the shot time, composite photograph including illustration/title, post card (composition of characters and an image), album printing (image layout, character) or the like.

(Reception/Sorting Section 700 <Common to the Normal Processing Process and the Special Processing Process>)

With this reception/sorting section 700, the cartridges 122 are sorted according to the normal printing processing or the special printing processing.

Furthermore, with the reception/sorting section 700, it is necessary to decide if each of the received cartridges 122 has an IC chip 100 or not, if the customer wants to change the cartridge having no IC chip to the one with the IC chip 100 or not, and if the customer wants the digital data for the index print 106 to be input on the IC chip 100.

With the reception/sorting section 700, the cartridges 122 are sorted into four types of the mark A or D described below, and cartridges corresponding to the mark A or B are transferred to the detaching/splicing section 702 which is the first process of the normal processing process. In addition, cartridges corresponding to the mark C or D are transferred to the special processing process described later.

First, the processing process of the cartridges 122 with the mark A or B will be described.

(Detaching/Splicing Section 702 <Normal Processing Process>)

A detaching/splicing section 702 is a process to take out the negative film 110 from the cartridge 122, as well as detach (remove) the rear end portion from the spool 126, splice (join) a plurality of negative films 110 longitudinally, to prepare a roll film. In addition, undeveloped negative films 110 (printing with film processing) and developed negative films 110 (re-ordered printing) are sorted and spliced, respectively.

This detaching/splicing section 702 is provided with an IC reader 704. This IC reader 704 has a function to read the information from the IC chip 100 provided in the cartridge 122 described above.

This IC reader 704 checks the sorting first, for example, decides whether there is mixed a negative film 110 for the special printing in the negative films for the normal printing, in spite of having formed a roll film only with the negative film 110 for the normal printing.

Next, the IC reader 704 reads the reception information such as the printing conditions (for example, the aspect ratio), the number of prints and the like in the normal printing.

In the detaching/splicing section 702, the cartridge ID is read from the cartridge 122 detached from the negative film 110, and the information including a set of the cartridge ID and the information read from the IC reader 704, is stored in the LSI card (not shown) serving as an information recording card and passing through each process.

In the case of the re-ordered print (it belongs in the normal print), there are the cartridges 122 with the IC chip and the cartridges 122 without the IC chip. Therefore, in the case of the cartridge 122 without the IC chip, since the order contents are recorded in the magnetic recording layer 116, a flag instructing to read the order contents in the magnetic recording layer 116 is set.

Furthermore, when the cartridge 122 (negative film 110) selected for the processing is for the special printing, the format information other than the information described above are recorded on the IC chip 100. This format information may be stored directly in the detaching/splicing section 702, but a flag may be simply set to show that the cartridge is for the special printing.

The communication between each process is not limited through the LSI card, and the magnetic recording layer 116 of the negative film 110 may be used, or the information may be sent out directly to a predetermined process (generally, the next process) as on-line data.

(Negative Film Developing Section 708 <(Normal Processing Process)>)

The undeveloped negative films 110 spliced in a roll form are sent to the negative film developing section 708, and in a conventional negative film developing machine of the developing section 708, the negative films 110 are subjected to the development processing and transferred to a scanner section 710 which is the next process.

(Scanner Section 710 <Normal Processing Process>)

In the scanner section 710, the main work is to digitally read the images recorded on each negative film 110, and the digital data read out here is transmitted to the analog printer section 714 to prepare an index print. On the index print a plurality of small images are recorded, and it is only necessary to grasp each image briefly, therefore a scanner having a relatively low resolution is used to read it.

When the negative films 110 in a roll form are loaded in a predetermined position, it is pulled out from the uppermost layer, and the information is read from the magnetic recording layer 116 of each negative film 110 and the information recorded in the IC chip 100 is read from the LSI storing the information recorded in the IC chip as set for above. Furthermore, the negative film 110 has an optically recorded ID (negative film ID), and the scanner section 710 reads this optical information (negative film ID), and the information is searched based on this negative film ID. In addition, by this search, not only the corresponding information can be obtained from the LSI card, but also it can be decided whether there is any information recorded on the IC chip 100 in the normal printing, or whether there is a special printing request mixed in the normal printing requests.

In addition, if there is no information for the printing in the IC chip 100, the information for the printing is prepared based on the information recorded in the magnetic recording layer 116.

(Analog Printer Section 714 <Normal Processing Process>)

In the analog printer section 714, the images recorded on each negative film 110 are printed on a printing paper (not shown). In the case of the printing with film processing, the index print 520 is also prepared for each negative film 110. In the case of re-ordered printing, each of the specified image frames is positioned, and printing is performed for the specified number.

At this time, the predetermined masking is performed on the negative film 110 and the printing paper based on the specified aspect ratio, the magnification is adjusted, then printing is performed. Basically if there is no designation of the aspect ratio, printing is performed in the H size. Moreover, the processing possible with the printing with film processing is also performed.

The rolled negative films 110 whose printing processing have been completed are transferred to a desplicer/reattacher section 716 which is the next process.

(Desplicer/Reattacher Section 716 <Normal Processing Process>)

The cartridge magazine is transferred to the desplicer/reattacher section 716, where the negative film ID which is recorded on each negative film 110 of the rolled negative films 110 is read, and while verifying with the cartridge ID recorded on the cartridge 112, each negative film 110 is accommodated in the corresponding cartridge 112.

Thereafter, the cartridges 112 accommodated are accommodated in another cartridge magazine in the order of splicing of the negative films 110.

Thus, the order of separating or desplicing the negative films 110 coincides with the order of arrangement of the cartridges 112, thereby the work is smoothly performed in the desplicer/reattacher section 716.

Here, when a negative film for the special printing gets mixed in the rolled negative films 110, a flag is set in the LSI card to show the mixing in the detaching/splicing section 702, thereby at the time of releasing the splicing of this negative film 110, it is informed visually by the display or the like, and auditorily by the alarm or the like.

(Verifying Section 722 <Common to the Normal Processing Process and Special Processing Process>)

In a verifying section 722, the cartridge 112 which has accommodated the negative film 110, printing papers, and the index print 520 are all collected, and received in a DP bag (not shown), while being verified based on the ID attached thereto, respectively, and returned to the customer.

In addition, in this verifying section 722, the negative film 110 requiring the special printing is transmitted to the special printing process. Such a negative film 110 for the special printing which has got mixed in the normal printing can be picked up easily even manually by the operator in the verifying work, because the printing paper (and the index print 106) corresponding thereto does not exist.

The processing flow in the cartridge 122 with the mark C or D will now be described. This special processing process is provided in the large laboratory system, but has actually a processing process corresponding to the minilab system. (Detaching/Development/Attaching Section 724 <Special Processing Process>)

Since the mark C shows a printing with film processing, the negative film 110 accommodated in the cartridge 122 is undeveloped. Therefore, the negative film 110 is separated from the cartridge 122 (detaching section 726), processed in the development section 728 for each film, and accommodated in the cartridge 122 again after the development processing is completed (attaching section 730). The cartridge 122 in which the developed negative film 110 is accommodated is transferred to the high resolution scanner section 732 which is the next process.

On the other hand, the mark D shows a re-ordered printing, the negative film 110 accommodated in the cartridge 122 has been developed. Therefore, the above-mentioned detaching/development/attaching section 724 is passed and the cartridge accommodating the negative film 110 is transferred to the scanner section 732.

(High Resolution Scanner Section 732)

With this high resolution scanner section 732, scanning with a relatively high resolution is required in order to print on the printing paper based on the read-out digital data. Recently, images as good as those obtained in the analog printing can be obtained, and the trend is moving toward this digital printing.

Since each image is recorded based on the digital data, it is suitable for preparing the special print.

In the high resolution scanner section 732 are arranged an IC reader 734 for reading the information from the IC chip 100 and an IC writer 736 for writing the information in the IC chip. The IC reader 734 and the IC writer 736 may be provided in an independent form with respect to the high resolution scanner section 732, but it is preferred that they be incorporated in the negative-film carrier (not shown) for transferring the negative film 110 in the high resolution scanner section 732. Therefore, in this embodiment, they are incorporated in a section loading a cartridge 122 in the negative-film carrier. Thereby, the information on the IC chip 100 can be read or written in a state that the cartridge 122 is set in the negative-film carrier.

While the negative film 110 is being taken out from the cartridge 122, if the cartridge 122 is held, the negative film 110 is caused to move in a zigzag manner. On the other hand, while the information is being read from the IC chip 100 or written in the IC chip 100, it is necessary to hold the cartridge 122.

Therefore, read or write of the information from/to the IC chip 100 is performed at a time other than during the transfer of the negative film 110, that is, immediately after the loading before taking out the negative film 110 from the cartridge 122, or immediately before taking out after the negative film 110 is accommodated in the cartridge 122.

As the read-out information (the information for the special printing herein), there are, for example, the illustration image data, frame number of the image to be composed with this illustration image and the format information of respective images, and based on the read-out information, the frame image and the illustration image are composed in a predetermined format, and transmitted to a digital printer section 738 as the printing data (digital). In this case, the information for correcting the exposure is transmitted at the same time. The special printing may be not for the whole negative film but for only a particular image frame(s), and the others may be normal printing. Therefore, the high resolution scanner section 732 reads the digital image data of each image frame, and transmits it to the digital printer section 738. Incidentally, the cartridge 122 in which the negative film 110 whose images have been read out is accommodated is sent to the above-mentioned verifying section 222.

(Digital Printer Section 738 <Special Processing Process>)

If there are any image for normal printing with film processing and re-ordered printing in the negative film 110, the digital printer section 738 performs the printing of the image, and then performs the special printing.

The printing papers finished in the digital printer section 738 are sent to the verifying section 722.

The operation flow in the above-mentioned large laboratory system will now be described.

As shown in FIG. 13, in the printing, there are normally four types of cartridges 122 to be received. Reference mark A indicates the cartridge for re-ordered printing regardless of the presence of the IC chip, mark B indicates the cartridge for printing with film processing regardless of the presence of the IC chip, mark C indicates the cartridge for special printing (printing with film processing) with the IC chip, and mark D indicates the cartridge for re-ordered special printing regardless of the presence of the IC chip.

Since marks A and B are both for the normal printing, the films in the cartridges having the mark A or B are spliced for each mark in the order of reception to be formed in a roll in the detaching/splicing section 702. Here, the cartridge having the mark B is for the printing with film processing, therefore it is transferred to the scanner section 710 after being developed in the developing section 708. Since the mark A is for the re-ordered printing, the film in the cartridge having the mark A is sent to the scanner section 710, passing the developing section 708. Furthermore, marks C and D are both for the special printing, the films in the cartridges having mark C or D are processed in a so-called minilab system (processing in a unit of cartridge). Here, since the mark C is for the printing with film processing, the negative film 110 is detached from the cartridge 122, accommodated in the cartridge 122 immediately after the development processing in the detaching/development/attaching section 724 and transferred to the high resolution scanner section 732. On the other hand, since the mark D is for the re-ordered printing, the cartridge having the mark D is transferred to the high resolution scanner section 732, passing the detaching/ development/attaching section 224.

With the scanner section 710, the magnetic information is read out from the sent rolled negative films 110 rolled. Furthermore, in the case of the printing with film processing, the digital data for preparing the index print 106 is read out from the whole negative film. On the other hand, in the case of the re-ordered printing, the read of the image is not performed unless there is a special request.

Then, the information for correcting the exposure of the image frame to be printed is obtained and transmitted to the printer section 714, as well as this information for correcting the exposure is written in the magnetic recording layer 116.

In the analog printer section 714, each image frame is positioned to the printing position, and the printing is performed based on the information for correcting the exposure transmitted from the scanner section 710, and the negative films 110 rolled are transferred to the reattaching/desplicing section 716.

To the reattaching/desplicing section 716, the cartridge 122 which has been separated from the negative film 110 has been preliminarily transferred.

Hence, the negative film 110 is accommodated in the corresponding cartridge 122, and this cartridge 122, the printing papers, and the index print 106 are sent to the verifying section 222. In the verifying section 722, the above-mentioned each photograph material (cartridge 122, the printing paper, and the index print 106) are received in a DP bag, and returned to the customer.

Then, with the high resolution scanner section 732, the information is read out from the IC chip 100, to grasp which special print is to be performed, and when there is the data such as the illustration image or the like, the data is read out at the same time, and the composing processing of the image on the negative film with the data is performed, then the digital image data and the information for correcting the exposure of each image are sent to the digital printer section 738.

Furthermore, in the case of the mark C, all images are read out, and the digital image data and the information for correcting the exposure of each image are sent to the digital printer section 738.

When the above-mentioned processing is completed, the cartridges 122 of the marks C and D are transferred to the verifying section 722, after the predetermined information is written in the IC chip 100.

With the digital printer section 738, for example, the image is formed on a printing paper by laser scanning, and the printing paper on which the image is formed and the index print are transferred to the verifying section 722.

In the verifying section 722, for example, when any cartridge 122 corresponding to the mark C or D is got mixed in the cartridges 122 of the marks A and B, it is sent back to the high resolution scanner section 732 from the verifying section 722 and subjected to the above-mentioned process.

As described above, in the case of the normal printing, the current laboratory system is used for the processing, and in the case of the special printing, a so-called minilab-type system for processing in a unit of cartridge is provided in the current laboratory system, therefore, the special printing whose request number is relatively small can be processed in parallel without largely changing the current system.

In addition, in this embodiment, the request of the special printing (printing with film processing), that is, the cartridge 122 of the mark C is developed in the minilab-type system provided in the current laboratory system together with the cartridges of the mark D, however, in this case, the detaching/development/attaching section 724 is required, resulting in the increase in the number of process. Therefore, as shown in FIG. 14, the flow may be such that the cartridges of the mark C are developed in the current laboratory system together with the cartridges of marks A and B, and passing the scanner section 710, the negative films 110 are re-loaded in the cartridges 122 in the desplicing/reattaching section 716, and transferred to the high resolution scanner section 732.

[Fifth Embodiment (Minilab Digital Printing)]

FIG. 15 shows a digitized minilab system.

With this digital minilab system, the image is formed based on the digital image data, regardless of the normal printing or the special printing.

The system construction is almost the same with that of the system corresponding to the special printing shown in FIG. 13 (the minilab-type system provided in the current laboratory system), therefore the same reference numeral is given thereto, and their explanation will be omitted.

With this digital minilab printing system, all processing can be performed in a single system, hence the cost for equipment is not so large, and it is suitable for a so-called small-sized processing.

In this digital minilab printing system shown in FIG. 15, since the image for the printing with film processing is also subjected to the digital processing, the high resolution scanner section 732 and the digital printer section 738 are essential. Therefore, as shown in FIG. 16, all cartridges (marks A to D) are received, and only the cartridge which can be processed in the current minilab system is processed here, and others (marks C and D) may be sent to other laboratory system internally for the processing, and after the processing, it is returned to the customer.

What is claimed is:

1. A method for allowing data of a shooting film accommodated in a cartridge which lacks a data recording medium to be stored in a data recording medium by removing the film from the cartridge and placing the film in a cartridge having a data recording medium, said method being performed by a laboratory system which develops the shooting film, prints on a printing paper each developed image on the developed shooting film, reads out by a reading means the developed image recorded on the shooting film, and temporarily stores by a memory means the read-out data of the image data, said method comprising the steps of:

taking out a shooting film to be developed from a cartridge which lacks a data recording medium, in order to develop the film;

developing the film;

winding up the shooting film in a cartridge after development, the cartridge having a recording medium provided thereon;

reading an ID which is pre-recorded on the shooting film;

printing the ID on the cartridge having a recording medium;

reading out image data recorded on the shooting film by a reading means;

storing the read-out image data in a memory means; and recording the stored image data, together with magnetic information and optical information pre-recorded on the shooting film, including any combination thereon, on the data recording medium of the cartridge having a recording medium.

2. The method according to claim 1, wherein the magnetic information and optical information pre-recorded on the shooting film are read out by a scanner.

3. The method according to claim 1, wherein the magnetic information and optical information pre-recorded on the shooting film are read out by a film carrier provided in a printer.

4. A method according to claim 1, wherein the image data, magnetic information and optical information pre-recorded on the shooting film, including any combination thereof, is recorded on the data recording medium of the cartridge having a recording medium by a film carrier provided in a printer.

5. A method for allowing data of a shooting film accommodated in a cartridge which lacks a data recording medium to be stored in a data recording medium by removing the film from the cartridge and placing the film in a cartridge having a data recording medium, said method being performed by a laboratory system which develops the shooting film, prints on a printing paper each developed image on the developed shooting film, reads out by a reading means the developed image recorded on the shooting film, together with magnetic information and optical information pre-recorded on the shooting film, and temporarily stores by a memory means the image data and the magnetic information and optical information, comprising:

taking out a shooting film to be developed from a cartridge which lacks a data recording medium, in order to develop the film;

developing the film;

reading out image data recorded on the shooting film, together with an ID pre-recorded on the film, by a reading means after development;

storing the read-out image data and ID data in a memory means;

winding up the shooting film in a cartridge, the cartridge having a recording medium provided thereon;

reading out an ID which is pre-recorded on the shooting film, and, when the shooting film is being wound up, reading the image data and the magnetic information and optical information data corresponding to the ID from the memory means; and recording the image data, together with the magnetic information and optical information data, on the data recording medium of the cartridge having a recording medium.

6. The method according to claim 5, wherein the magnetic information and optical information pre-recorded on the shooting film are read by a scanner.

7. The method according to claim 5, wherein the image data, magnetic information and optical information pre-recorded on the shooting film, including any combination thereof, is recorded on the data recording medium of the cartridge having a recording medium by a device which winds up the shooting film in the cartridge.

8. The method according to claim 5, wherein said printed image is one of a composition of a plurality of digital image data, a composition of the digital image data and an illustrated image data, and a composition of digital image data and character data, according to the read-out printing conditions.

* * * * *